US010600336B2

(12) United States Patent
Duerstock et al.

(10) Patent No.: US 10,600,336 B2
(45) Date of Patent: Mar. 24, 2020

(54) MULTIMODAL IMAGE PERCEPTION SYSTEM AND METHOD

(71) Applicant: Purdue Research Foundation, West Lafayette, IN (US)

(72) Inventors: Bradley S. Duerstock, West Lafayette, IN (US); Juan P. Wachs, West Lafayette, IN (US); Ting Zhang, West Lafayette, IN (US); Greg Williams, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/284,505

(22) Filed: Oct. 3, 2016

(65) Prior Publication Data

US 2017/0098390 A1 Apr. 6, 2017

Related U.S. Application Data

(60) Provisional application No. 62/236,179, filed on Oct. 2, 2015.

(51) Int. Cl.
*G09B 21/00* (2006.01)
*G06K 9/62* (2006.01)
*G06K 9/46* (2006.01)

(52) U.S. Cl.
CPC ......... *G09B 21/007* (2013.01); *G06K 9/6278* (2013.01); *G06K 9/4604* (2013.01)

(58) Field of Classification Search
CPC .. G06K 9/6278; G06K 9/4604; G09B 21/007; G09B 21/008
See application file for complete search history.

(56) References Cited

U.S. PATENT DOCUMENTS

| | | | | |
|---|---|---|---|---|
| 7,215,812 B1* | 5/2007 | Masaki | ..................... | H04N 1/60 358/518 |
| 2003/0156136 A1* | 8/2003 | Cattell | ................... | G16B 45/00 715/771 |
| 2008/0193048 A1* | 8/2008 | Sun | ......................... | G06T 11/60 382/284 |
| 2008/0309676 A1* | 12/2008 | Nehab | ...................... | G06T 9/00 345/582 |

(Continued)

OTHER PUBLICATIONS

Green, A., et al, "Enhancing Performance for ActionandPerception: Multisensory Integration, Neuroplasticity and Neuroprosthetics, Part II", Progress in Brain Research, 2011, pp. 65.

(Continued)

*Primary Examiner* — Mekonen T Bekele
(74) *Attorney, Agent, or Firm* — Purdue Research Foundation

(57) ABSTRACT

A real-time multimodal image perception system to transform the standard lab blood smear image for persons with BVI to perceive, employing a combination of auditory, haptic, and vibrotactile feedbacks. These sensory feedbacks are used to convey visual information in appropriate perceptual channels, thus creating a palette of multimodal, sensorial information. A Bayesian network is provided to characterize images through two groups of features of interest: primary and peripheral features. A method is provided for optimal matching between primary features and sensory modalities.

16 Claims, 21 Drawing Sheets

(56) References Cited

U.S. PATENT DOCUMENTS

| | | | | |
|---|---|---|---|---|
| 2009/0074300 | A1* | 3/2009 | Hull | G06F 17/30247 |
| | | | | 382/209 |
| 2009/0092301 | A1* | 4/2009 | Jerebko | G06T 17/20 |
| | | | | 382/128 |
| 2009/0100050 | A1* | 4/2009 | Erol | G06F 17/30026 |
| 2009/0125510 | A1* | 5/2009 | Graham | G06K 9/00463 |
| 2014/0049491 | A1* | 2/2014 | Nagar | G06F 3/016 |
| | | | | 345/173 |
| 2014/0243614 | A1* | 8/2014 | Rothberg | A61B 8/13 |
| | | | | 600/301 |
| 2015/0324646 | A1* | 11/2015 | Kimia | G06T 7/80 |
| | | | | 348/62 |
| 2017/0075701 | A1* | 3/2017 | Ricci | H04W 4/21 |

OTHER PUBLICATIONS

Bach-Y-Rita, P., "Tactile Sensory Substitution Studies", New York Academy of Sciences, 2004, pp. 83-91.

Burkhard, R., "Quadratic Assignment Problems", Springer Sciences+Business Media New York, 2013, pp. 2741-2814.

Chaudhuri, B., et al, "Characterization and featuring of histological section images", Pattern Recognition Letters 7, 1988, pp. 245-252.

Duerstock, B., et al, "Technologies to Facilitate the Active Participation and Independence of Persons with Disabilities in STEM from College to Careers", From College to Careers: Fostering Inclusion of Persons with Disabilities in STEM, 2014, pp. 5-73.

El-Glaly Y., et al, "Digital Reading Support for the Blind by Multimodal Interaction", Proceedings of the 16th International Conference on Multimodal Interaction, 2014, pp. 439-446.

Evans, K., et al, "Natural cross-modal mappings between visual and auditory features", Journal of Vision, 2010, pp. 1-12.

Fritz, J., "Haptic Representation of Scientific Data for Visually Impaired or Blind Persons", 1996, pp. 5.

Heller, M., "Tactile picture perception in sighted and blind people", Behavioural Brain Research,135, 202, pp. 65-68.

Johnson, L., "Navigation Aid for the Blind Using Tactile-Visual Sensory Substitution", Proceedings of the 28th IEEE, 2006, pp. 6290-6292.

Kim, H., "Haptic User Interface Design for Students with Visual Impairments" In Proceedings of the 11th International ACM SIGACCESS Conference on Computers and Accessibility, 2009, pp. 2.

Lecuyer, A., et al, "HOMERE: a Multimodal System for Visually Impaired People to Explore Virtual Environments" In Proceedings of the IEEE Virtual Reality, 2003, pp. 8.

Marks, L., "On Cross-Modal Similarity: Auditory-Visual Interactions in Speeded Discrimination", Journal of Experimental Psychology: Human Perception and Performance, 1987, pp. 384-394.

Morgan, N., et al, "A comparative study of multimodal digital map interface designs for blind users", Int. J. Artificial Intelligence and Soft Computing, 2015, pp. 69-86.

Plimmer, B., et al, "Signing on the Tactile Line: A Multimodal System for Teaching Handwriting to Blind Children", ACM Trans. Comput-Hum. Interact., 2011, pp. 29.

Postma, A., et al, "Differences between early-blind, late-blind, and blindfolded-sighted people in haptic spatial-configuration learning and resulting memory traces", Perception, 2007, pp. 1253-1265.

Turk, M., "Multimodal interaction: A review", Pattern Recognition Letters, 2014, pp. 189-195.

Walker, L., et al, "A common scheme for cross-sensory correspondences across stimulus domains", Perception, 2012, pp. 1186-1192.

Yu, W., et al, "Web-based multimodal graphs for visually impaired people," presented at the 1st Cambridge Workshop on Universal Access and Assistive Technology (CWUAAT), Cambridge, England, 2002, pp. 13.

National Science Board, "Science and Engineering Indicators", 2014, pp. 600.

Bach-Y-Rita, P., et al, "Form perception with a 49-point electrotactile stimulus array on the tongue: A technical note," J. Rehabil. Res. Dev., vol, 35; No. 4; 1998, pp. 427-430.

Heller, M., et al, "Tactile picture perception in sighted and blind people," Behav. Brain Res., vol. 135, No. 1-2, 2002, pp. 65-680.

Bach-Y-Rita, P., et al, "Sensory substitution and the human-machine interface," Trends Cogn. Sci., vol. 7, No. 12, 2003, pp. 541-546.

Ward, J., et al, "Visual experiences in the blind induced by an auditory sensory substitution device," Conscious. Cogn., vol. 19, No. 1, 2010, pp. 492-500.

Capelle, C., et al, "A real-time experimental prototype for enhancement of vision rehabilitation using auditory substitution," IEEE Trans. Biomed. Eng., vol. 45, No. 10, 1998, pp. 1279-1293.

De Volder, A., et al, "Auditory triggered mental imagery of shape involves visual association areas in early blind humans," NeuroImage, vol. 14, No. 1, 2001, pp. 129-139.

Arno, P., "Auditory coding of visual patterns for the blind," Perception, vol. 28, No. 8, 1999, pp. 1013-1029.

Meers, S., et al, "A vision system for providing the blind with 3D colour perception of the environment," Fac. Inform.—Pap. Arch.; 2005; pp. 7.

Cruz-Roa, A., et al, "Visual pattern mining in histology image collections using bag of features," Artif. Intell. Med., vol. 52, No. 2, 2011, pp. 91-106.

Chaudhuri, B., et al, "Characterization and featuring of histological section images," Pattern Recognit. Lett., vol. 7, No. 4, 1988, pp. 245-252.

Davis, L., et al, "Texture Analysis Using Generalized Co-Occurrence Matrices," IEEE Trans. Pattern Anal. Mach. Intell., vol. PAMI-1, No. 3, 1979, pp. 251-259.

Clausi, D., "An analysis of co-occurrence texture statistics as a function of grey level quantization," Can. J. Remote Sens., vol, 28, No. 1, 2002, pp. 45-62.

Canny, J., "A Computational Approach to Edge Detection," IEEE Trans. Pattern Anal. Mach. Intell., vol. PAMI-8, No. 6, 1986, pp. 679-698.

Friedman, N., "Learning Belief Networks in the Presence of Missing Values and Hidden Variables," in Proceedings of the Fourteenth International Conference on Machine Learning, 1997, pp. 125-133.

Bourgeois, F., "An Extension of the Munkres Algorithm for the Assignment Problem to Rectangular Matrices," Commun ACM, vol. 14, No. 12, 1971, pp. 802-804.

Zhu, S., "Identifying the effectiveness of using three different haptic devices for providing non-visual access to the web", Interacting with Computers, 2011, pp. 565-581.

Williams, G., "3D Printing Tactile Graphics for the Blind: Application to Histology", In Annual Rehabilitation Engineering Society of North American Conference, 2014, pp. 4.

* cited by examiner

| Feature | Test Images | Task |
|---|---|---|
| Intensity | | 1. Which is the darkest object in this image?<br>2. Compare the darkness difference between the left two objects and the right two objects. Which difference is larger? |
| Texture | | 1. Are the left two objects of the same texture?<br>2. How many different textures are in this image? |
| Shape | | 1. What is the shape of the top left object?<br>2. How many different shapes are in this image? |
| Color | | 1. Are the left two objects of the same color?<br>2. How many different colors are in this image? |

*FIG. 14*

| Test Images | Task |
|---|---|
| Red blood cell vs. White blood cell | 1. Are the left two objects of the same texture?<br>2. How many different textures are in this image? |
| Sickle cell | 1. What is the shape of the top left object?<br>2. How many different shapes are in this image? |

*FIG. 15*

MULTIMODAL IMAGE PERCEPTION SYSTEM AND METHOD

CROSS-REFERENCE TO RELATED APPLICATIONS

The present patent application is related to and claims the priority benefit of U.S. Provisional Patent Application Ser. No. 62/236,179, filed Oct. 2, 2015, the contents of which are hereby incorporated by reference in their entirety into the present disclosure.

GOVERNMENT SUPPORT CLAUSE

This invention was made with government support under GM096842 awarded by the National Institutes of Health. The government has certain rights in the invention.

TECHNICAL FIELD

The present disclosure generally relates to an alternate means of image perception, and in particular to a perceiving images using multimodal sensory feedback that does not depend upon visual perception.

BACKGROUND

This section introduces aspects that may help facilitate a better understanding of the disclosure. Accordingly, these statements are to be read in this light and are not to be understood as admissions about what is or is not prior art.

According to the 2011 National Health Interview Survey (NHIS) Preliminary Report, it is estimated that 21.2 million adult Americans, namely more than 10% of all adult Americans have trouble seeing. Among the 6.6 million working-age adults with blindness or visually impaired (BVI), 64% did not finish high school and approximately only 6% earned a Bachelor's or higher degree. The lack of proper and effective assistive technologies (AT) can be considered as a major obstacle for individuals that are BVI to actively participate in science and advanced research activities. It is still a challenge for them to perceive and understand scientific visual data acquired during wet lab experimentation, such as viewing live specimens through a stereo microscope or histological samples through light microscopy (LM). According to Science and Engineering Indicator 2014 published by NSF, no more than 1% of blind or visually impaired people are involved in advanced science and engineering research and receive doctoral degrees.

When using alternative single-modality human-computer interfaces (HCI), only limited visual information can be acquired due to different limitations of other senses. For instance, tactile-vision sensory substitution (TVSS) technologies, such as Tongue electrotactile array, and tactile pictures, have been demonstrated capable of conveying visual information of spatial phenomenology, however the low resolution of such somatosensory display arrays are a limitation of these methods to convey complex image information. Auditory-vision sensory substitution has also been studied in image perception. Trained early blind participants showed increased performance in localization and object recognition through this substitution. However, auditory-vision substitution involves the memorization of different audio forms and training is required to map from different audio stimulus to visual cues. The required attention on auditory feedback can decrease subjects' ability to get information from the environment. Existing solutions cannot help convey to blind persons the richness, complexity and amount of visual data readily understood by persons without disabilities. Therefore, improvements are needed in the field.

SUMMARY

The present disclosure provides a real-time multimodal image perception system and method which offers feedback to a visually impaired user through multiple sensory modalities, including auditory, haptics and vibrotactile. According to one aspect, the present disclosure provides a method for A method for enabling visually impaired users to interpret data, comprising receiving an input image using a computer processor, receiving a navigation command from a visually impaired user, extracting a plurality of features from the input image to acquire at least one extracted image feature based on the navigation command using the processor, developing a Bayesian network using the processor, the Bayesian network is configured to characterize the input image through the two groups of features of interest, the features comprising primary features and peripheral features, and outputting an expression of the plurality of features through a plurality of sensory modalities to allow a visually-impaired user to interpret the image features.

According to another aspect, the present disclosure provides system for enabling visually impaired users to interpret data, comprising an image input device for receiving an image, a user input device which is configured to allow the user to navigate within the image, a plurality of output devices configured to output a plurality of sensory modalities to a visually impaired user, and a computer processing unit operatively connected to the plurality of output devices. The computer processing unit is configured to receive an input image, receive a navigation command from a visually impaired user, extract a plurality of features from the input image to acquire at least one extracted image feature based on the navigation command, develop a Bayesian network, the Bayesian network is configured to characterize the input image through the two groups of features of interest, the features comprising primary features and peripheral features, and output an expression of the plurality of features through a plurality of sensory modality to allow a visually-impaired user to interpret the image features.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 14 shows test images and tasks for various features.

FIG. 15 shows test images and tasks for blood cell image features.

Figure 1:
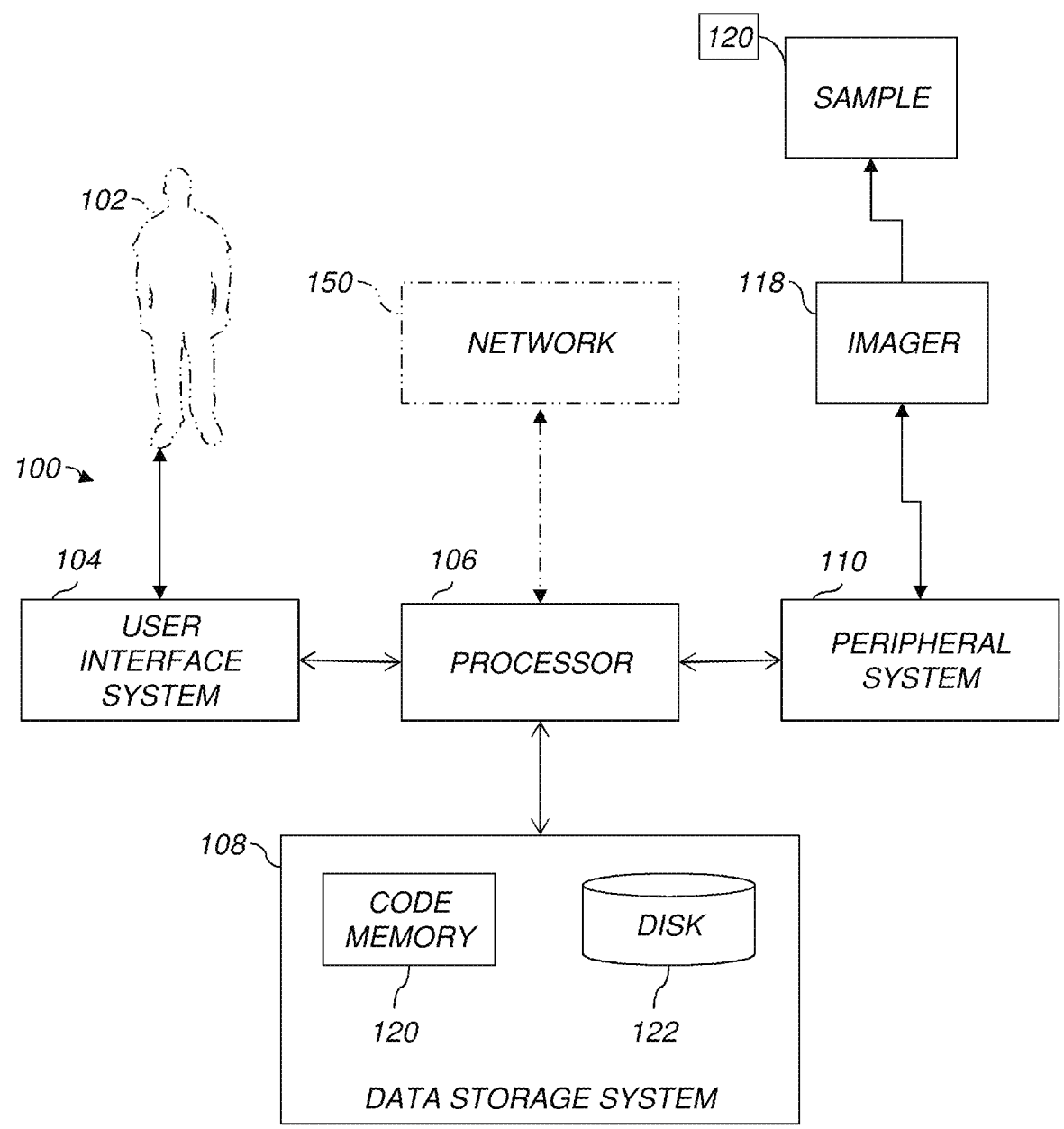
FIG. 1 depicts a multimodal system and method for perceiving images according to one embodiment.

The attached drawings are for purposes of illustration and are not necessarily to scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a multimodal image perception system 100 which allows a blind or visually impaired (BVI) user 102 to perceive an image. The system 100 provides real-time multimodal image perception which incorporates feedback to the user via multiple sensory modalities, including auditory, haptics and vibrotactile. As shown, the system 100 comprises a user interface 104, a computer processor 106, data storage system 108, and a peripheral system 110. The peripheral system 110, the user interface system 104, and the data storage system 108 are communicatively connected to the processor 106. Processor 106 can be communicatively connected to network 150 (shown in phantom), e.g., the Internet or a leased line, for communication of the data described herein to other computing devices. Measurement systems discussed herein can each include one or more of systems 104, 106, 108, and 110, and can each connect to one or more network(s) 150. Processor 106, and other processing devices described herein, can each include one or more microprocessors.

Processor 106 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

Data storage system 108 can include or be communicatively connected with one or more processor-accessible memories configured or otherwise adapted to store information. The memories can be, e.g., within a chassis or as parts of a distributed system. In an example, data storage system 108 includes code memory 120, e.g., a RAM, and disk 122, e.g., a tangible computer-readable rotational storage device or medium such as a hard drive. Computer program instructions are read into code memory 120 from disk 122. Processor 486 then executes one or more sequences of the computer program instructions loaded into code memory 441, as a result performing process steps described herein. In this way, processor 106 carries out a computer implemented process. For example, steps of methods described herein, blocks of the flowchart illustrations or block diagrams herein, and combinations of those, can be implemented by computer program instructions. Code memory 120 can also store data, or can store only code.

The user interface 104 may include an input device (e.g., an electronic stylus or a gripper), and a plurality of output devices to provide multimodal image feedback to the user, including but not limited to, an audio output device 112 (e.g., a loudspeaker, see FIG. 2), a haptic device 114, and a vibrotactile output device 116. Haptic, as used herein, refers to kinesthetic or force-feedback that can be experienced by the user when actively interacting with the system. It shall be understood that the input device (stylus or gripper) may be incorporated into the haptic device as a selection or navigation mechanism for the user to explore an image. The stylus may include an end-effector which is gripped by the user's hand. One example of a suitable haptic device 114 is the Force Dimension® Omega 6, which is utilized as a mouse pointer when force feedback is not activated. When force feedback is deployed, modality "Depth" and "Viscosity" are provided through the haptic device 114. Vibrotactile, as used herein, refers to vibration feedback which is perceived passively at the user's fingertips. One example of a suitable vibrotactile device 116 is the Tactors (manufactured by Engineering Acoustics, Inc. of Casselberry, Fla.) which may be attached to the user's skin or cloth. The vibrotactile device 116 may be configured to deliver vibration in different frequencies. For instance, to represent different color intensities, a positive correlation may be built between the frequency of vibration and the intensity of color. Namely, dark color is corresponding to strong vibration, while light color is conveyed by weak vibration.

The user interface system 104 may include more than one haptic or vibrotactile device. For example, two haptic devices 114 may be provided, so that the user 102 can interact with the system 100 using both hands. In one example, a haptic device 114 is used by a first hand of the user to navigate the image and a second hand of the user is used to interact with the vibrotactile device 116 to perceive the image features.

Figure 3:
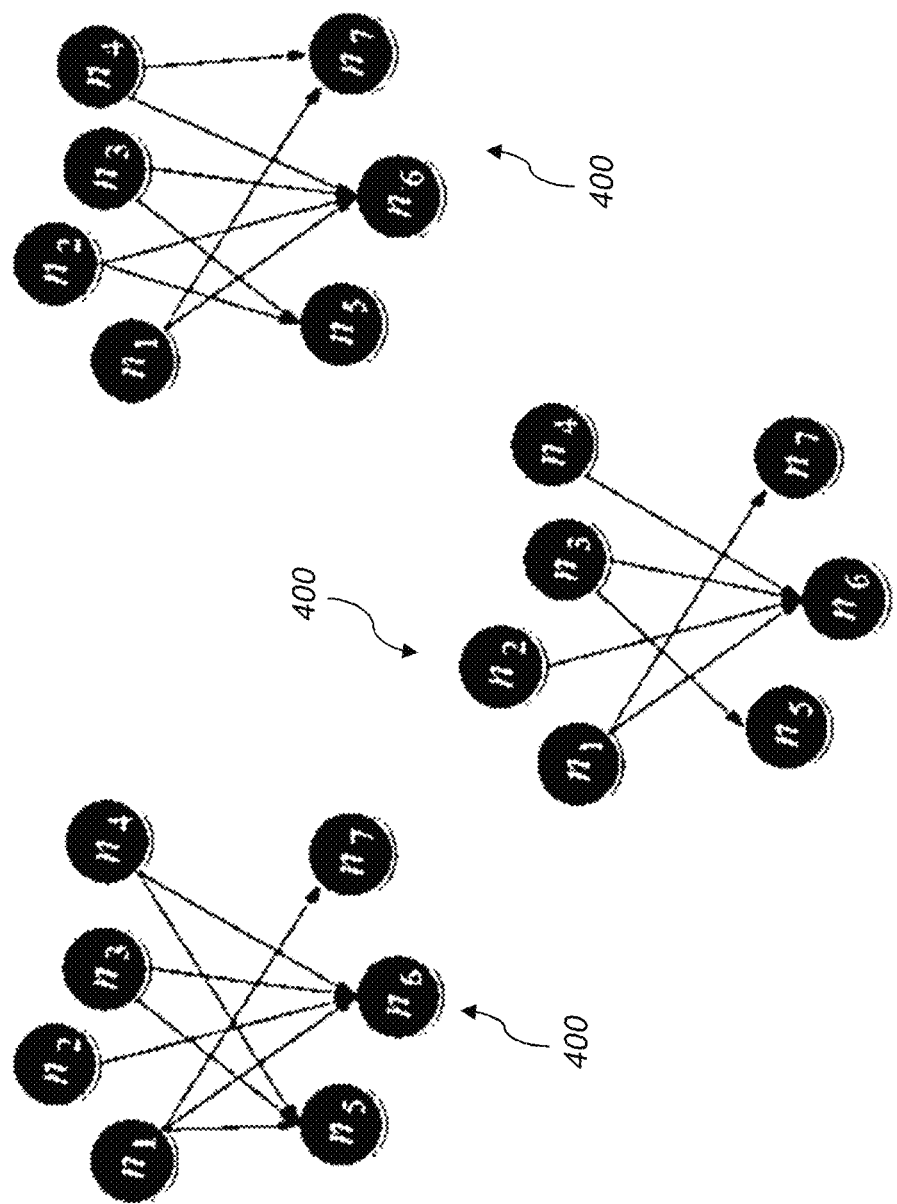
FIG. 3 depicts a plurality of candidate Bayesian structures generated by the system of FIG. 1.

An imager 118 (e.g., a microscope or camera) may be provided to generate image data from a sample 120, such as a histology (blood smear) image for input to the system 100. Besides substituted features, some other key features of the image are inferred through a Bayesian network as discussed below. FIG. 3 is a photograph depicting a blind or visually impaired (BVI) user operating the system 100.

Figure 2:
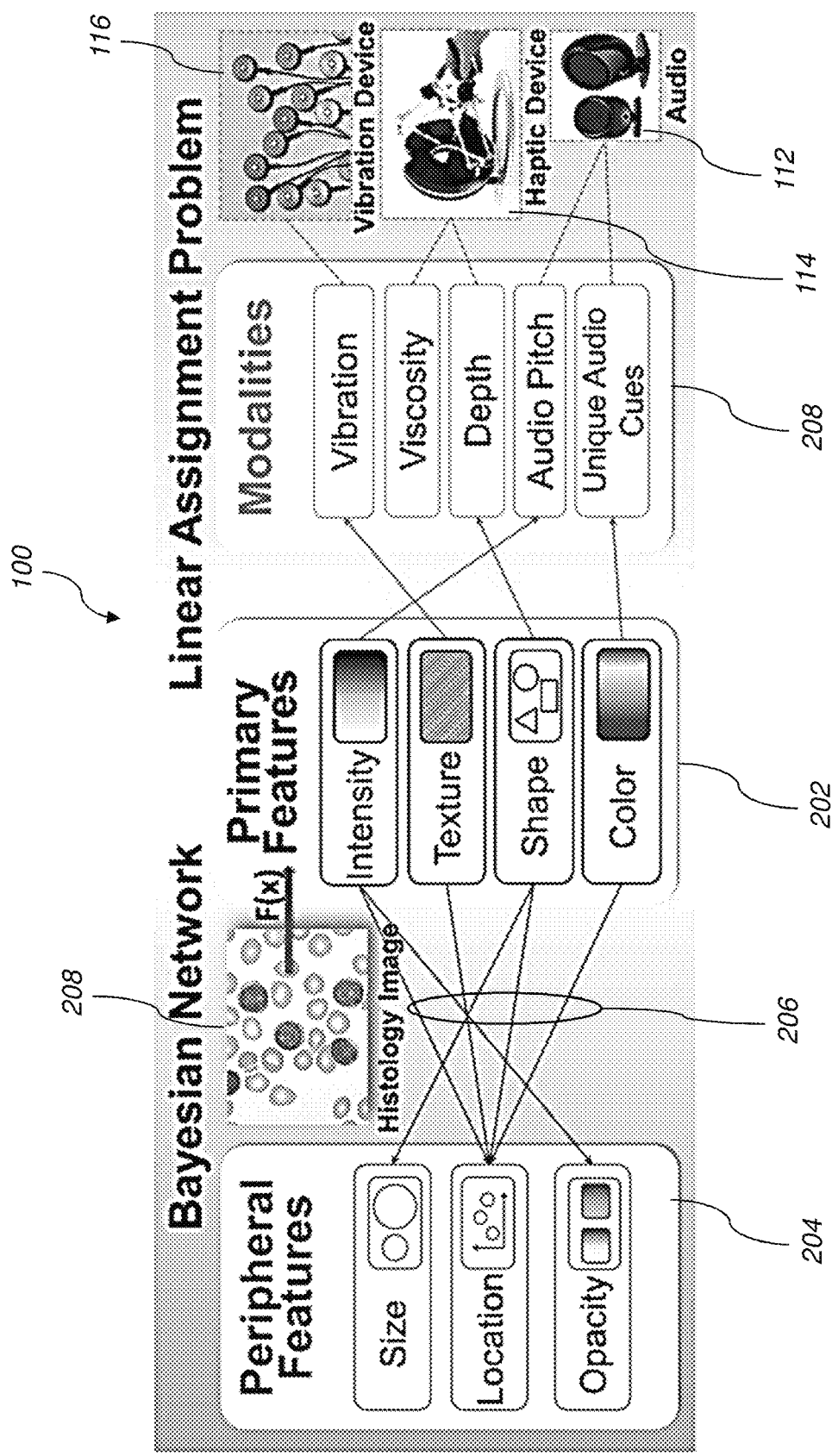
FIG. 2 depicts a data processing portion of the system of FIG. 1 according to one embodiment.

When looking at different images, people's visual focus may be different depending on the media, the content and context of the information conveyed. The system 100 analyzes a plurality of features to encapsulate the content of an image in a compact manner. In one example embodiment, the objects' location, intensity, texture, shape, color, size and opacity are determined as they constitute the key perceptual information that was found necessary for blind or visually impaired people to understand histology images, although other perceptual information can be utilized as well. These plurality of features are classified by the system 100 into two groups: primary features 202 and peripheral features 204, as shown in FIG. 2. The arrows 206 between these features indicate "cause-effect" relationship, or what the evidence is and what is inferred from this evidence through a Bayesian network, which is used to conduct inferences among groups of information. After extracting the primary features 202 from the input image, the output of the system 100 is the tangible expression of the extracted features through different modalities 208 (e.g., vibration, viscosity, depth, audio pitch, and unique audio cues). These modalities, in turn, are assigned to specific devices (e.g. (audio device 112, haptic device 114 and vibrotactile device 116) which are used to enable the user to manipulate and explore the image. In one example, intensity, texture, shape and color are categorized as primary features 202 that can be directly mapped to other modalities, while location, size and opacity are classified as peripheral features 204 since they can only be acquired through experience, or inferred through the frequency of occurrence of primary features (see FIG. 2).

In one embodiment, the primary features 202 are extracted from the image using image processing algorithms. For example, the intensity of each pixel in the image may be computed through the summation of weighted RGB values, as in Eq. (1).

$$\text{Intensity} = 0.2989*R + 0.5870*G + 0.1140*B, \quad (1)$$

where R, G and B represents the value in red, green and blue channels of a pixel, respectively.

With respect to texture, differentiation of object textures is realized using gray-level co-occurrence matrices. To define a gray-level co-occurrence matrix P[i,j], a displacement vector d=(dx,dy) is specified first and then counting all pairs of pixels separated by d having gray levels i and j. After the matrix is generated, there are several statistics used to characterize a texture [16]. Entropy measures the randomness of gray-level distribution, which is defined according to Eq. (2):

$$\text{Entropy} = -\sum_i \sum_j P[i, j] \log P[i, j]. \quad (2)$$

The features of energy, contrast and homogeneity may be defined as follows.

$$\text{Energy} = \sum_i \sum_j P^2[i, j] \quad (3)$$

$$\text{Contrast} = \sum_i \sum_j (i-j)^2 P[i, j] \quad (4)$$

$$\text{Homogeneity} = \sum_i \sum_j \frac{P[i, j]}{1 + |i - j|} \quad (5)$$

In one example, with respect to shape, to characterize the shape or boundary of an object in a color image, a conversion from color to grayscale is first performed, and then Canny edge detection algorithms are utilized. Finally chain code is used to represent the shape in a compact fashion.

In one example, color information is obtained by brightness normalized RGB values of pixels.

In one embodiment, a Bayesian network 208 is generated by the system 100 to infer the probability of the peripheral features 204 based on evidences exhibited by the occurrence and the amount of the primary features 202 (see FIG. 2). The construction of Bayesian network is a three-step process according to on embodiment.

1. First Step:

In the first step, Expert-based modeling (in this case the expert is a BVI user) is used to generate fundamental structures of the Bayesian network 208. In the illustrated example, there are seven nodes wherein each node represents the perception of an image feature (e.g., intensity, texture, shape, color, size, location, or opacity). The nodes are of type Boolean, which in this case means whether a certain feature is perceived or not. The definition and states of each node in the illustrated example are summarized in Table I.

TABLE I

DEFINITION OF DISCRETE STATES FOR EACH NODE

| Node | Description (Perception of feature) | States |
|---|---|---|
| $n_1$ | Intensity | {True, False} |
| $n_2$ | Texture | {True, False} |
| $n_3$ | Shape | {True, False} |
| $n_4$ | Color | {True, False} |
| $n_5$ | Size | {True, False} |
| $n_6$ | Location | {True, False} |
| $n_7$ | Opacity | {True, False} |

Several candidate structures 400 (shown in FIG. 3, which shows candidate Bayesian structures generated by human experts) are generated by human experts during this step.

2. Second Step:

Since each link in the Bayesian network 208 is associated with a conditional probability of inferring a child node from a parent, a probability function is applied by the system 100 to calculate the probability of each link from observations obtained through experiments. The probability function is defined according to Eq. (6).

$$P(n_i \mid n_j) = \frac{P(n_i, n_j)}{P(n_j)} = \frac{N(n_i = 1, n_j = 1)}{N(n_j = 1)} \quad (6)$$

where N(x) counts the number of records in the observations.

Figure 4:
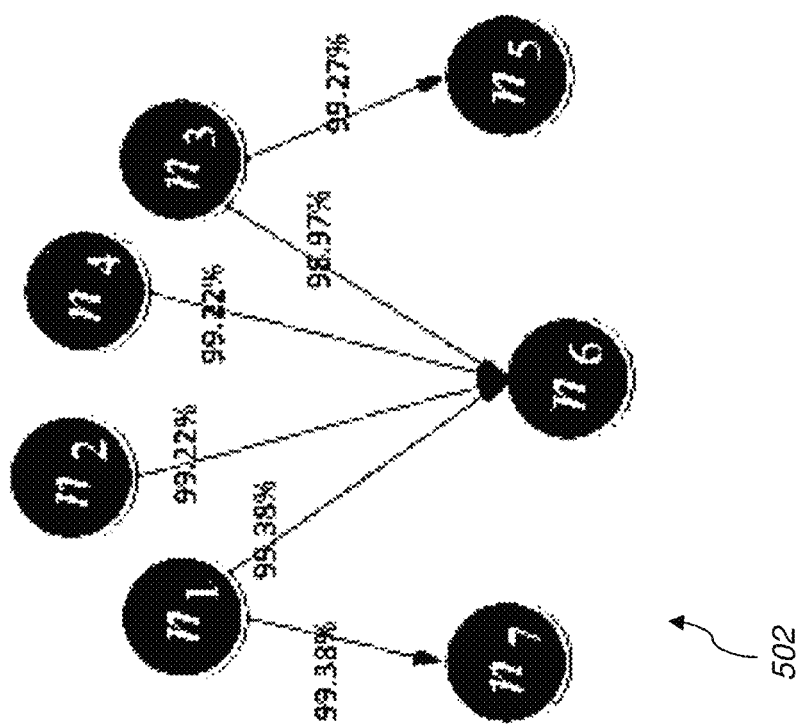
FIG. 4 depicts a optimized Bayesian structure determined by the system of FIG. 1.

3. Third Step:

At last, to determine the optimal structure between candidate structures 400 generated by human experts, a Bayesian scoring function is defined by the system 100 as:

$$P(D \mid G) = \prod_{i=1}^{N} \prod_{j=1}^{q_i} \frac{\Gamma(N_{ij})}{\Gamma(N_{ij} + M_{ij})} \prod_{k=1}^{r_i} \frac{\Gamma(a_{ijk} + s_{ijk})}{\Gamma(a_{ijk})}, \quad (7)$$

where $$N_{ij} = \sum_{k=1}^{r_i} a_{ijk}, \quad (8)$$

$$M_{ij} = \sum_{k=1}^{r_i} s_{ijk}, \quad (9)$$

where D represents the observation dataset obtained through experiments, G represents the candidate Bayesian structure 400 and N is the number of nodes in the network. $q_i$ is the number of possible instantiations of node i's predecessors; $r_i$ is the number of different values of node i; $a_{ijk}$ is the parameter of a Bayesian network with Dirichlet distribution; $s_{ijk}$ is the number of tuples in the dataset where node i is equal to k and its predecessors are in jth instantiation. The optimal candidate Bayesian structure denoted with G* is the one that maximizes Eq. (7). FIG. 4 shows the optimal structure 502 with conditional probabilities defined in Eq. (6).

Modality Assignment Problem:

To convey the four primary features discussed in the above example (intensity, texture, shape, and color), the system 100 utilizes a plurality of sensory modalities. In one example, the sensory modalities include vibration, viscosity, depth, audio pitch and unique audio cues, taking different manifestations for each sensory type. It shall be understood that more or less than five sensory modalities may be used. One modality can only be used to represent one feature. Thus, the mapping problem between primary features and modalities can be considered as an assignment problem. Also, because some modalities may not be applicable to a certain feature in terms of its property and the modality's property, not all modalities need to be candidates for each feature. The system 100 may utilize a linear assignment problem method or a quadtractic assignment problem method to assign the image features to the various sensory modalities.

In one embodiment, the linear assignment problem is applied. There will be a particular cost for mapping one feature to one modality; therefore, the optimum mapping combination can be generated by finding the one that has the minimum total cost. Also, not all modalities need to be candidates for each feature because some modalities may not be applicable to a certain feature in terms of its property and the modality's property. Table II shows the candidate modalities for each feature.

TABLE II

CANDIDATE MODALITIES FOR EACH FEATURE

| Feature/Modality | M1: Vibration | M2: Viscosity | M3: Depth | M4: Audio Pitch | M5: Unique Audio Cues |
|---|---|---|---|---|---|
| F1: Intensity | ✓ | ✓ | ✓ | ✓ | |
| F2: Texture | ✓ | ✓ | ✓ | ✓ | |
| F3: Shape | ✓ | ✓ | ✓ | ✓ | |
| F4: Color | ✓ | | | | ✓ |

The formal definition of the linear assignment problem is: Given two sets, F, represents primary features of size 4 and M, denotes modalities of size 5, together with a cost function C: F×M→ $\Re$. Find a bijection function g: F→M such that the cost function is minimized:

$$\min \sum_{i \in F} \sum_{j \in M} C(i, j) x_{ij} \quad (10)$$

subject to the constraints:

$$\sum_{j \in M} x_{ij} = 1 \text{ for } i \in F,$$

$$\sum_{i \in F} x_{ij} = 1 \text{ for } j \in M.$$

Variable $x_{ij}$ denotes the assignment of feature i to modality j, taking value 1 if there is an assignment and 0 otherwise. According to Table II, the cost of no assignment between i and j represented in the cost matrix C(i,j) are set to be infinity. An extension of Munkres or Hungarian Algorithm is applied to solve this problem with a rectangle cost matrix since the number of features is different from the number of available modalities.

Figure 5:
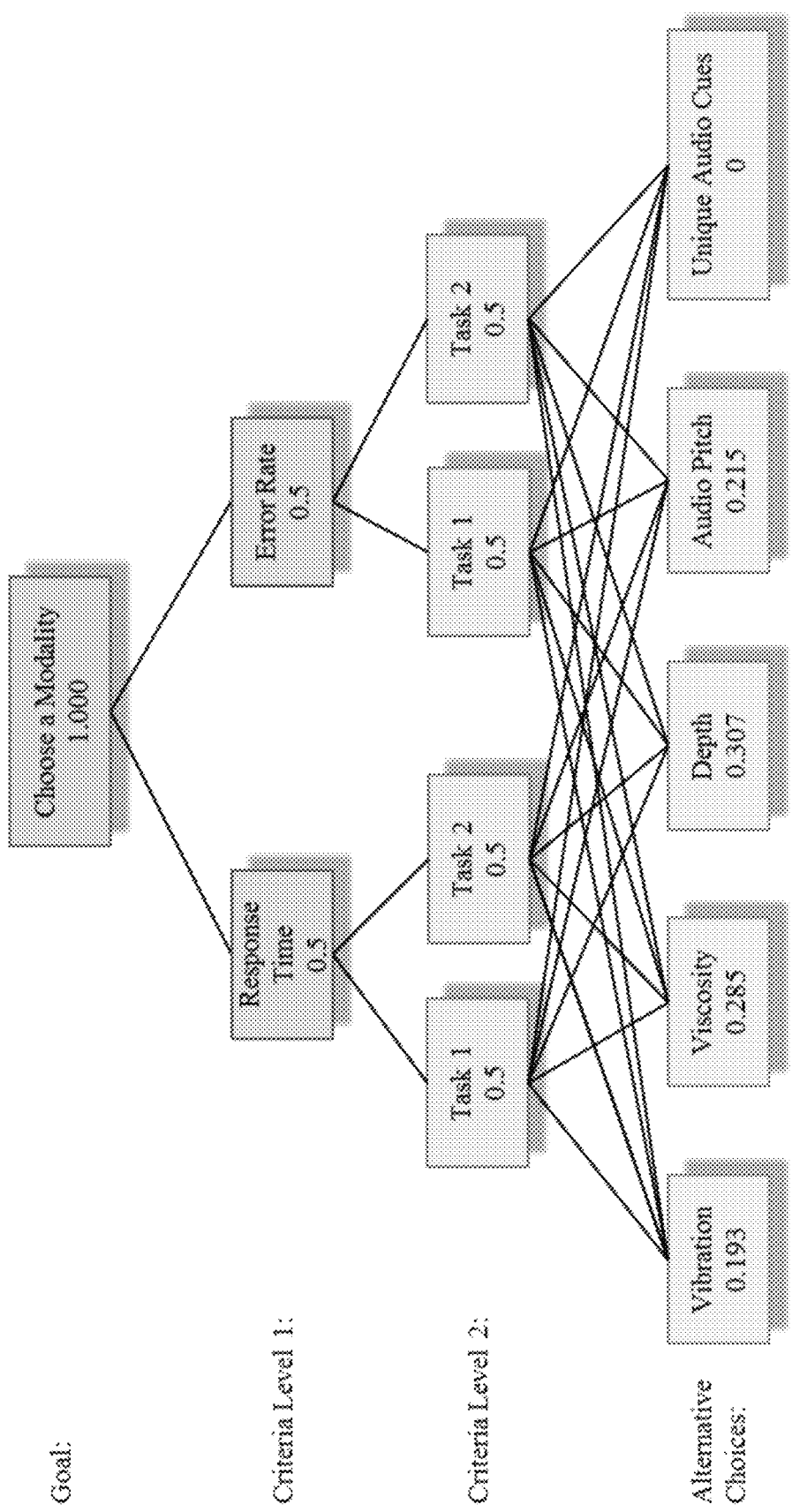
FIG. 5 depicts an analytic hierarchical tree determined by the system of FIG. 1.

After the objective function is defined, the individual cost $c_{ij}$ in the cost matrix C(i,j) for conveying image feature i through sensory modality j, needs to be computed. In one example, the individual cost was calculated using the data obtained from empirical experiments indicating human performance. Lower cost indicated better performance and vice versa. This performance is a consequence of experience cognitive load, memory allocation and task complexity. Human subjects were recruited to perform the same tasks using feedbacks from all candidate modalities. The human performance was evaluated through response time and error rate. And then for each feature, an analytic hierarchy process (AHP) was utilized to determine the cost for each candidate sensory modalities by participants' performance. An AHP can be expressed through a hierarchy tree 602 shown in FIG. 5. For each image feature, a hierarchy tree 602 is constructed. The goal of this problem, listed as the top layer, is choosing a modality for one image feature. The criteria used here are listed in the second and third layer. In the illustrated example, there are two levels of criteria. The first level is to determine the most effective modality by considering both response time and error rate. The second level is to determine the best modality considering different tasks. These two levels of criteria are then combined by the system 100 to determine the priority of a modality. The last layer in the tree 602 indicates the candidates for the assignment problem.

After the hierarchy tree is constructed, the next step is to determine the importance of different criteria. In one embodiment, response time and error rate are considered as the same importance to determine human performance. And different tasks performed are also considered as same importance. Therefore, the local weight of each criterion is all 0.5. It shall be understood that other relative weights may be used as well.

Followed by weights of criteria, the rating for each decision alternative for each criterion is calculated. This step is completed by first developing a pair wise comparison matrix for each criterion. The individual value in the matrix is computed following the Equation 11.

$$r_{ij} = \frac{a_i}{a_j} \quad (11)$$

where $r_{ij}$ indicates the individual value in the comparison matrix, $a_i$ represents corresponding value of a candidate in terms of the evaluated criterion. This matrix indicates how much better is candidate i over candidate j in terms of the selected criterion. A value that is larger than 1 represents better performance.

Taking task 1 for response time as an example, the matrix is represented in Table III.

TABLE III

Pair wise comparison matrix.

| | Vibration | Viscosity | Depth | Audio Pitch | Unique Audio Cues |
|---|---|---|---|---|---|
| Vibration | 1 | $r_{12}$ | $r_{13}$ | $r_{14}$ | $r_{15}$ |
| Viscosity | $1/r_{12}$ | 1 | $r_{23}$ | $r_{24}$ | $r_{25}$ |
| Depth | $1/r_{13}$ | $1/r_{23}$ | 1 | $r_{34}$ | $r_{35}$ |
| Audio Pitch | $1/r_{14}$ | $1/r_{24}$ | $1/r_{34}$ | 1 | $r_{45}$ |
| Unique Audio Cues | $1/r_{15}$ | $1/r_{25}$ | $1/r_{35}$ | $1/r_{45}$ | 1 |

The process of developing this comparison matrix is completed by then normalizing the matrix and averaging the values in each row.

Since both weights of criteria and average ratings of candidates are calculated, the final costs of the candidates are computed as the weighted average rating, following Equation 12.

$$c_{ij} = \sum_t w_t \times r_{tij} \qquad (12)$$

where $c_{ij}$ indicates the individual cost of mapping image feature i to sensory modality j, $w_t$ represents the global weight for criterion t and $r_{tij}$ indicates the individual rating computed by developing a comparison matrix in terms of criterion t. The global weight of a criterion is computed by multiplying its local weight with all the local weights of its top level's criteria, represented in Equation 3.

$$w_g = w_l \times \prod_i w_{li} \qquad (13)$$

where $w_g$ indicates the global weight, $w_l$ indicates the local weight and i represents the index of all its top level criteria.

Since the objective is to minimize the total cost, the smaller digit indicates higher performance and better option.

In a further embodiment, the assignment problem between image features and sensory modalities can be extended to a quadratic assignment problem (QAP) as well. A quadratic assignment problem is also one of the fundamental optimization problems in deciding combinations that solves assignment problem with linear costs between two parties. With solutions of linear assignment problem, only the costs between each pair of the two parties are considered to make the assignments. To get a more accurate assignment solution, more information should be taken into consideration. By extending this problem to a quadratic assignment problem, two more matrices are required, one to represent the relationships of the four primary image features and the other to indicate the relationships between the five output sensory modalities. The formal definition of the QAP is: Given two sets, F ("image features") of size 4 and M ("sensory modalities") of size 5, together with a weight function w:F×F→ $\Re$, a distance function d:M×M→ $\Re$; and a cost function C:F×M→ $\Re$. Find the bijection g:F→M such that the cost function is minimized in Equation 14.

$$\min \sum_{i=1}^{n} \sum_{j=1}^{n} w_{ij} \times d_{\phi(i)\phi(j)} + \sum_{i=1}^{n} c_{i\phi(i)} \qquad (14)$$

where n is the size of F and φ(i) indicates all possible permutations between F and M.

Since the size of M is one larger than the size of F, five repeated computations of (14) are performed with one modality taken out each time. Then the solution in these five assignments with the minimum cost was selected as the optimized assignment.

To solve this quadratic assignment problem, a simulated annealing algorithm is applied by swapping two features i and j and accordingly computing the change in objective function Equation 14. The change was calculated using Equation 15.

$$\delta = c_{i\phi(j)} + c_{j\phi(i)} - c_{i\phi(i)} - c_{j\phi(j)} + 2\sum_{k \neq i,j} (w_{jk} - w_{ik})(d_{\phi(i)\phi(k)} - d_{\phi(j)\phi(k)}) \qquad (15)$$

To define the two matrices that express the relations among image features themselves, W, and the relations among sensory modalities themselves, D, the co-occurrence relations are applied in both matrices by the system 100. For image features, co-occurrence relation is defined as the perception of two image features at the same time. If there is a co-occurrence relation between two image features, then the corresponding value in the matrix is 1, otherwise it is 0. Matrix W is shown in Table IV. For sensory modalities, the co-occurrence relation is defined as the simultaneous utilization of two sensory modalities. If two modalities are used to interpret something simultaneously, then the corresponding value in matrix D is 1, and vice versa. Table V shows the co-occurrence relations between different sensory modalities. In the context of QAP, the related image features should be assigned to co-related sensory modalities.

TABLE IV

Co-occurrence matrix for image features.

|  | Intensity | Texture | Shape | Color |
|---|---|---|---|---|
| Intensity | 1 | 1 | 1 | 0 |
| Texture | 1 | 1 | 0 | 0 |
| Shape | 1 | 0 | 1 | 0 |
| Color | 0 | 0 | 0 | 1 |

TABLE V

Co-occurrence matrix for sensory modalities.

|  | Vibration | Viscosity | Depth | Audio Pitch | Unique Audio Cues |
|---|---|---|---|---|---|
| Vibration | 1 | 0 | 1 | 1 | 1 |
| Viscosity | 0 | 1 | 0 | 1 | 0 |
| Depth | 1 | 0 | 1 | 1 | 0 |
| Audio Pitch | 1 | 1 | 1 | 1 | 0 |
| Unique Audio Cues | 1 | 0 | 0 | 0 | 1 |

To validate the approach presented, two example experiments were been conducted. The goal of example 1 is to determine the proper costs in the cost matrix C(i,j) illustrated above from subjects' task performance. For each image feature, different modalities were compared to rank and each modality was matched to every feature through human performance testing. The ranking was then applied as individual costs in the cost matrix. The best combination of modality and the associated feature to it was computed by cost matrix solving Eq. (10). Lower cost indicated better human performance, therefore, the assignment with lowest total cost is considered as the optimal selection. Experiment 2 compared the multimodal system 100 with a traditional tactile paper approach using specialized thermal capsule paper.

Experiment 1: Finding the Rank of Modalities:

The objective of experiment 1 is to find out the costs of modalities for each image feature. Four blind subjects and six blindfolded subjects were recruited for this experiment. Three of the blind subjects are totally blind, while the other one claimed that he has a little light perception. All of the blind subjects are male from 25 to 50 years old and lost their vision at least five years before they participated in these experiments. The statistical analysis presented in the following section also indicated no significant difference between the group of blind and blind-folded subjects. A within-participants experiment was adopted, hence each subject was presented with all test conditions. Also, each subject was required to test all four primary features since the test on each feature is independent on other features. For each mapping from one feature to one modality, two images (highlighting a specific feature) were deployed. To alleviate the learning effect [Purchase 2012], different test images were presented for each modality in this experiment. Two tasks were performed for each image and a post-experiment survey was distributed after each group. Two different tasks were designed to permit generalizability. If only one task was used, the conclusions made would hold only for that particular task. One of the tasks performed in experiment 1 required participants to explore the whole image, which tested the performance of image navigation. The other task performed required participants to compare two specific objects, which tested the performance of differentiate certain features.

Since feature intensity was mapped to four modalities and for each mapping two test images were used, eight test images were deployed in total. Also, two tasks were performed for each test image, allowing sixteen trials for feature intensity. Since feature texture and shape were mapped to four modalities and feature color was mapped to two modalities (see Table II), there were 56 trials in total (16+16+16+8=56) in experiment 1 for each subject.

Response time and errors were recorded to evaluate human performance, which were used to compute the costs of modalities for each feature. The test images and tasks for each feature are summarized in FIG. 14.

Response time and number of error answers of the tasks were recorded to evaluate human performance. The human performance of modalities for each feature was then used to decide the costs of candidate modalities using an AHP. The cost of modality that showed shorter performance time and higher accuracy was smaller than the one of longer response time and lower accuracy. The costs were then considered to be individual costs in the cost matrix to generate the optimized mapping between image features and sensory modalities.

Figure 6A:
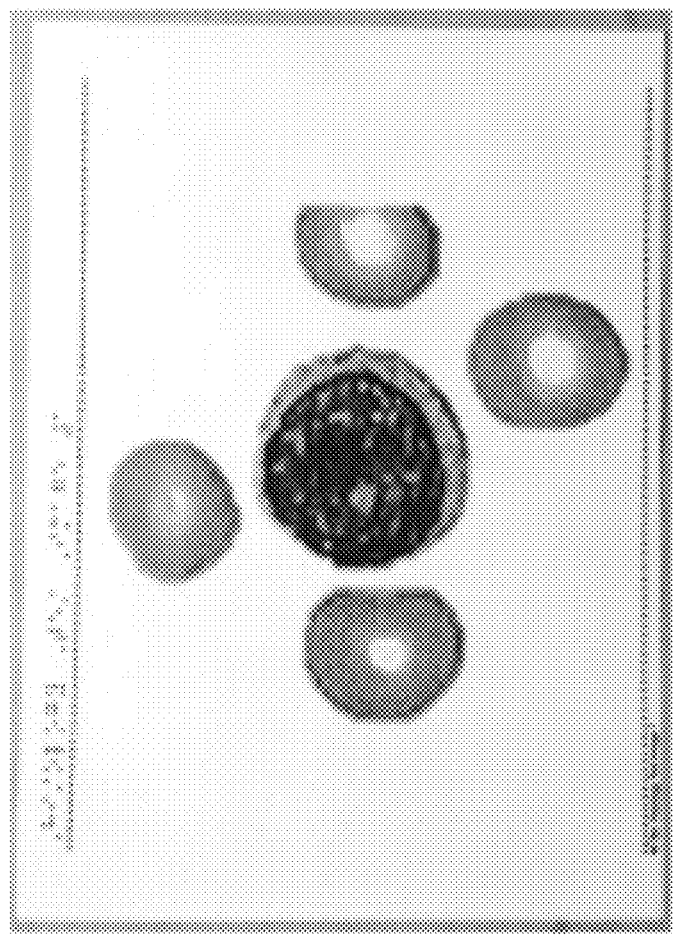
FIG. 6A depicts a tactile paper using thermal capsule paper from a top view.
Figure 6B:
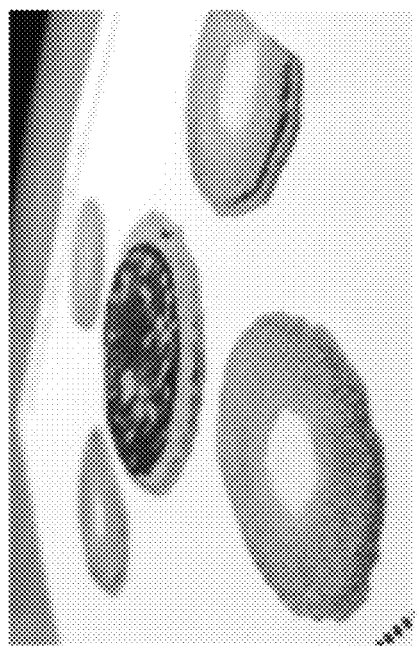
FIG. 6B depicts the tactile paper of FIG. 7A from a perspective view.

Experiment 2: Comparing with Print-Out Tactile Paper:

This experiment validated the effectiveness and efficiency of the studied multimodal image perception method with respect to a standard method to convey perceptual information to BVI persons—a print-out tactile paper (see examples in FIG. 6). Intensity information was used to generate a tactile image using thermal expansion paper. In FIG. 6B, it can be observed that dark regions are raised and higher than light regions due to heating and swelling of the printed areas. The highest parts of it are around 0.5 mm high. The images on the printed tactile paper are similar in size to the displayed images on a 21" computer screen.

Within-participants experiments were applied with five blindfolded subjects and five blind subjects in which each subject was presented with both methods. This sample size is acceptable since similar number of blind subjects were also used in other studies focusing on the learning experience of BVI students. All blind participants recruited in this study are between the ages of 25 to 50 and became blind at least five years before the experiments and are totally blind. Four of the blind subjects are male, and one is female. The size of the images shown on computer screen were limited to avoid the participants hitting the boundary of the haptic device's workspace. The order of method tested was randomized to decrease learning effect.

Blood smear images of two different types were tested. In the first type, the goal is to differentiate between red blood cells and white blood cells. Red blood cells and white blood cells has distinct intra-cellular structures. For example, red blood cell has a lighter central area with a gradually darker peripheral area, while white blood cells are nucleated that has a more complicated texture. The intensity changes and nucleated texture are two key points to distinguish between red and white blood cells. Besides intra-cellular patterns, they also differ in size, that red blood cells are mostly smaller than white blood cell. In the second type, the objective is to distinguish between normal red blood cells and sickle cells. The most obvious difference between normal red blood cells and sickle cells is the cell shape. Sickle cells are normally crescent shaped while normal red blood cells are circular. Sickle cells also lost the intra-cellular texture of normal red blood cell.

Test images and tasks are shown in FIG. 15. Response time and errors were recorded to evaluate human performance. Training trials were carried out to allow each participant to get familiar with the new interaction approach and avoid the learning effect.

Experiment 1 Results: Finding the Rank of Modalities:

The Statistical Analysis System (SAS) was used for data analysis in this study. According to the randomized complete block design of experiments, a mixed linear model was applied to analyze the experimental data. In a mixed linear model, both fixed and random factors affect experiment data. In this experiment, both modalities and groups of subjects (blind or blind-folded) were considered as the fixed factors, while different testing images and individual participants were considered as random factors. Statistical analysis indicated there was no significant difference between the group of blind and blind-folded subjects in all features and tasks (with $p>0.05$). Different testing images did not have an effect on the data, since no statically significance was found.

To determine the costs of modalities for each image feature, the mean response time and error rate of each matching between modality and feature were used. In terms of response time, to ensure normality of data, a logarithmic function was applied and statistical difference was then determined based on the transformed data. Data indicating no difference was considered as equal to determine the costs of modalities. An AHP tree was developed for each image feature.

Since two tasks were performed for each feature (see Table VI), each task had a local weight of 0.5. Also, both response time and error rate were of 0.5 local weights. In the results computed following the AHP, small digits indicated better performance and higher priority. Impossible assignments were represented by infinity. The mean response time and error rates of each matching between modality and feature are shown from FIGS. 8 to 11 in groups of features.

Intensity.

In terms of response time, for both task 1 and task 2, the model indicated there is a significant difference between the modalities ($p<0.0001$ for task 1, $p=0.0018$ for task 2). In terms of accuracy, the model didn't indicate a significant difference because most of the questions were answered correctly.

Figure 7A:
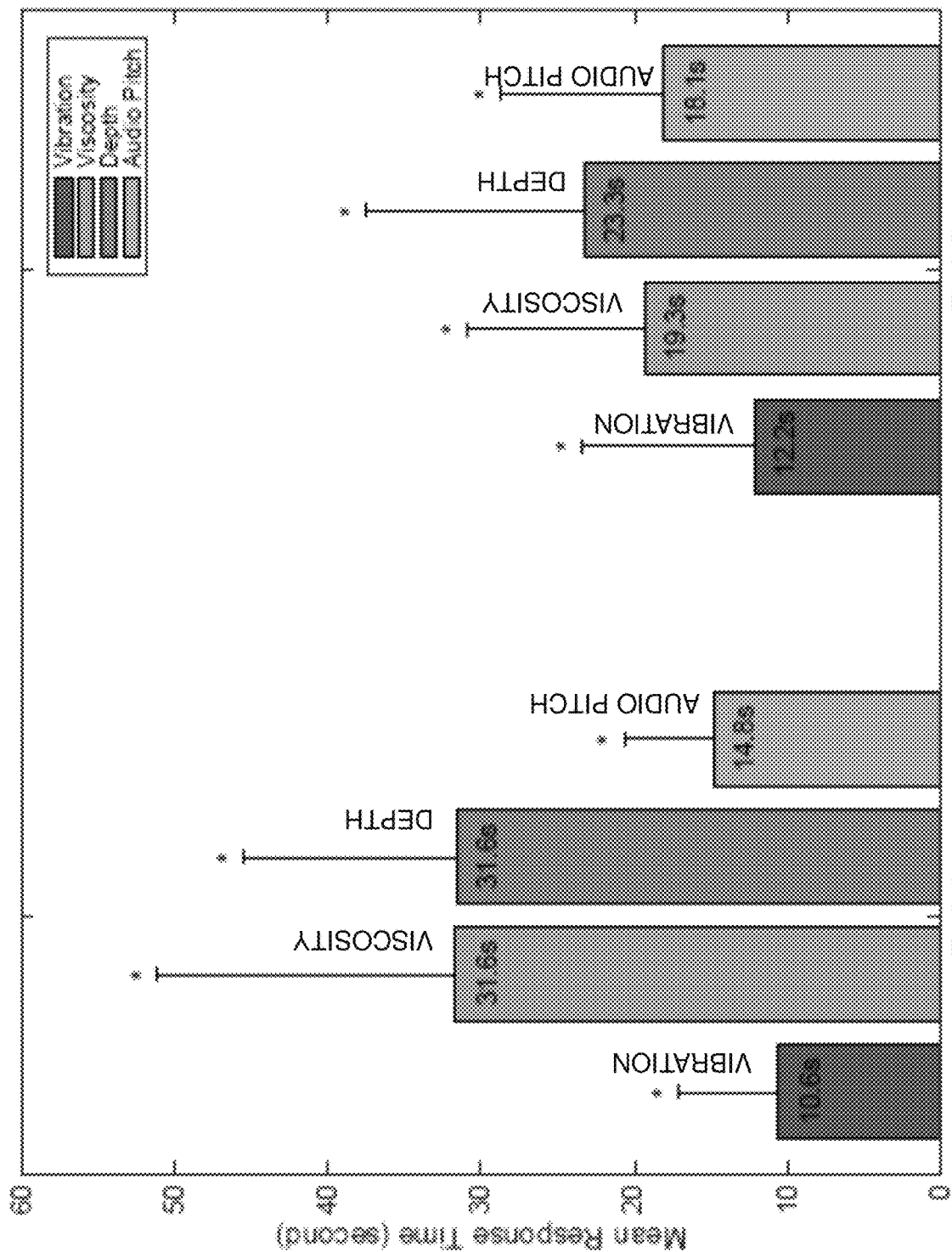
FIG. 7A depicts response time for feature intensity for one example using the system of FIG. 1.
Figure 7B:
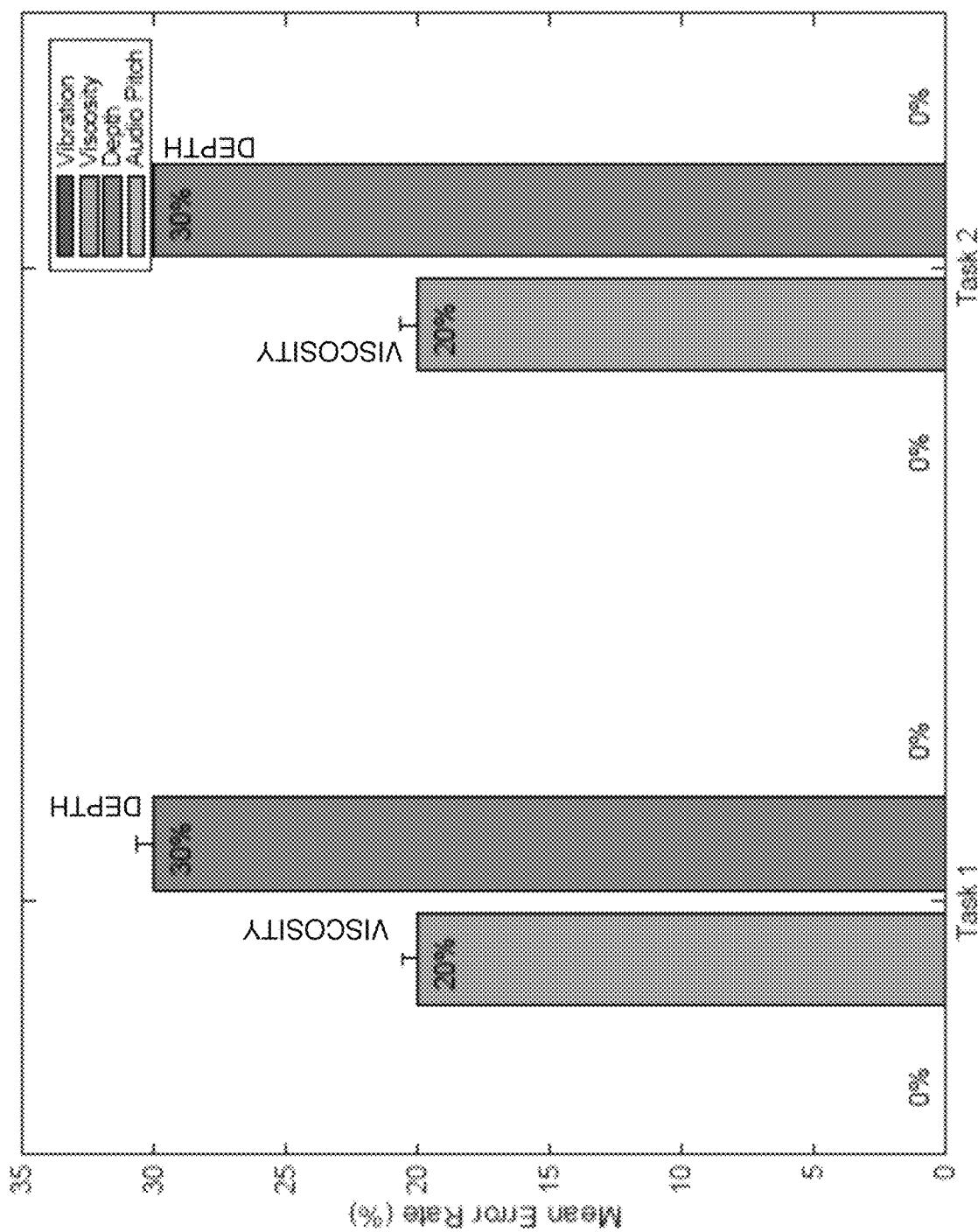
FIG. 7B depicts error rate for feature intensity for one example using the system of FIG. 1.

In FIG. 7A, it was observed that for task 1, best performance was achieved through modality vibration, followed by audio pitch, and lastly, viscosity and depth. For task 2, viscosity showed better performance than depth while the other two remains the same. In FIG. 7B, it was observed that for both tasks, both vibration and audio pitch showed higher accuracy than viscosity and depth, while viscosity showed higher accuracy than depth.

The computed costs of the four modalities for image feature intensity by following the AHP process are shown below:

$$C(1, j) = [0.197\ 0.280\ 0.294\ 0.229\ \infty]$$

Texture.

Figure 8A:
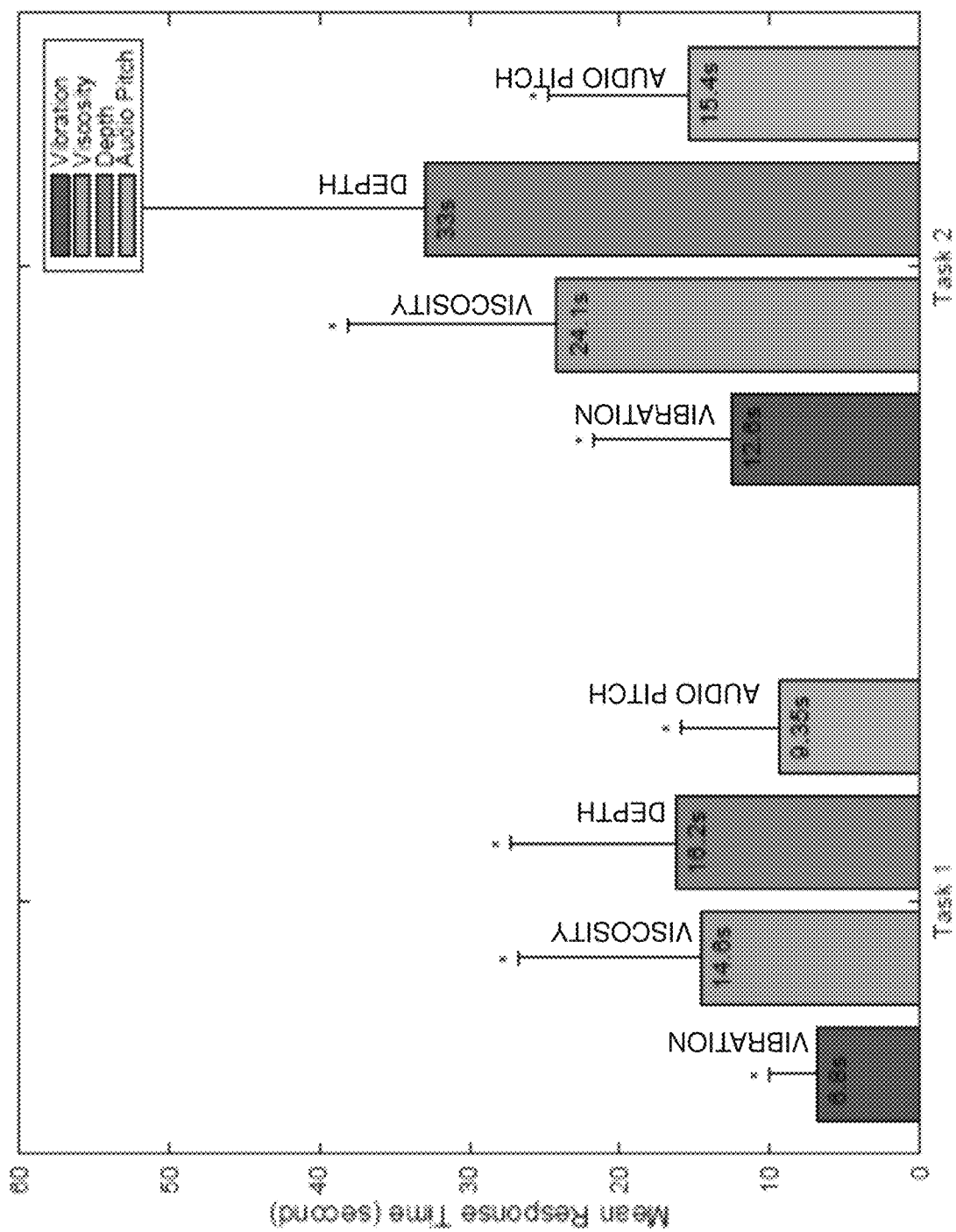
FIG. 8A depicts response time for feature texture for one example using the system of FIG. 1.
Figure 8B:
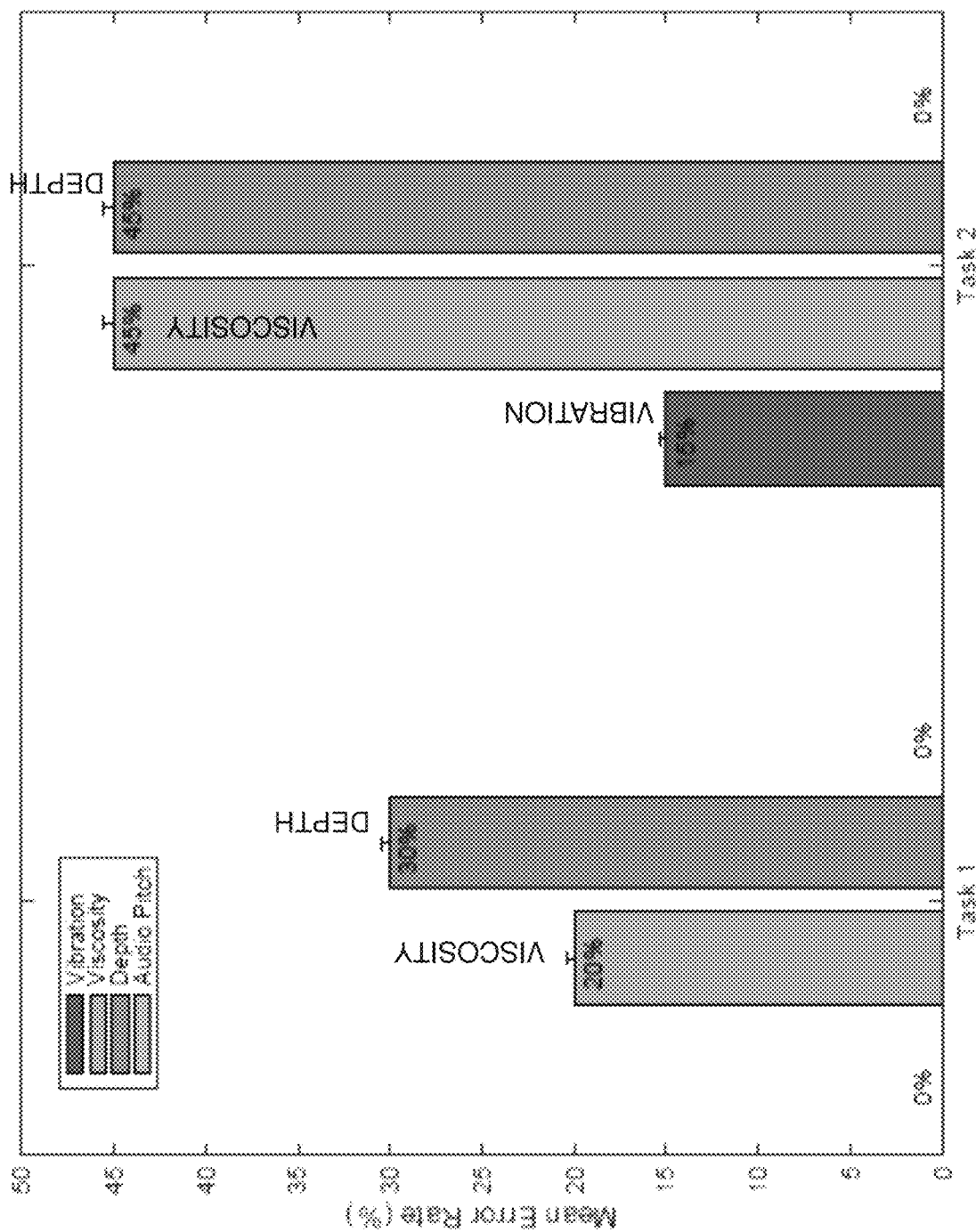
FIG. 8B depicts error rate for feature texture for one example using the system of FIG. 1.

In spite of the difference in error rate shown in FIG. 8B, no conclusion can be made to show if there was a statistical difference between the four modalities. Therefore, error rate was not considered when deciding the ranking of four modalities. When analyzing response time, the results indicated there was a significant difference between the four modalities for both tasks (p<0.0001).

From response time for both tasks (see FIG. 8A), it is apparent that vibration performed best, followed by audio pitch, viscosity and depth. Also, observed from FIG. 8B, the error rate of task 1 showed similar result as response time. Vibration and audio pitch showed 100% accuracy, followed by viscosity and depth. The computed cost matrix for image feature texture is represented as the following vector:

$$C(2, j) = [0.198\ 0.274\ 0.308\ 0.220\ \infty]$$

Shape.

The p-values of response time for task 1 and 2 were less than 0.0001, and the p-value of error rate for task 2 was 0.0093. Therefore, there was a significant difference between the four modalities in terms of these factors. However, no conclusion can be drawn from the error rate for task 1, and it was not considered in deciding the rank of modalities for feature shape.

Figure 9A:
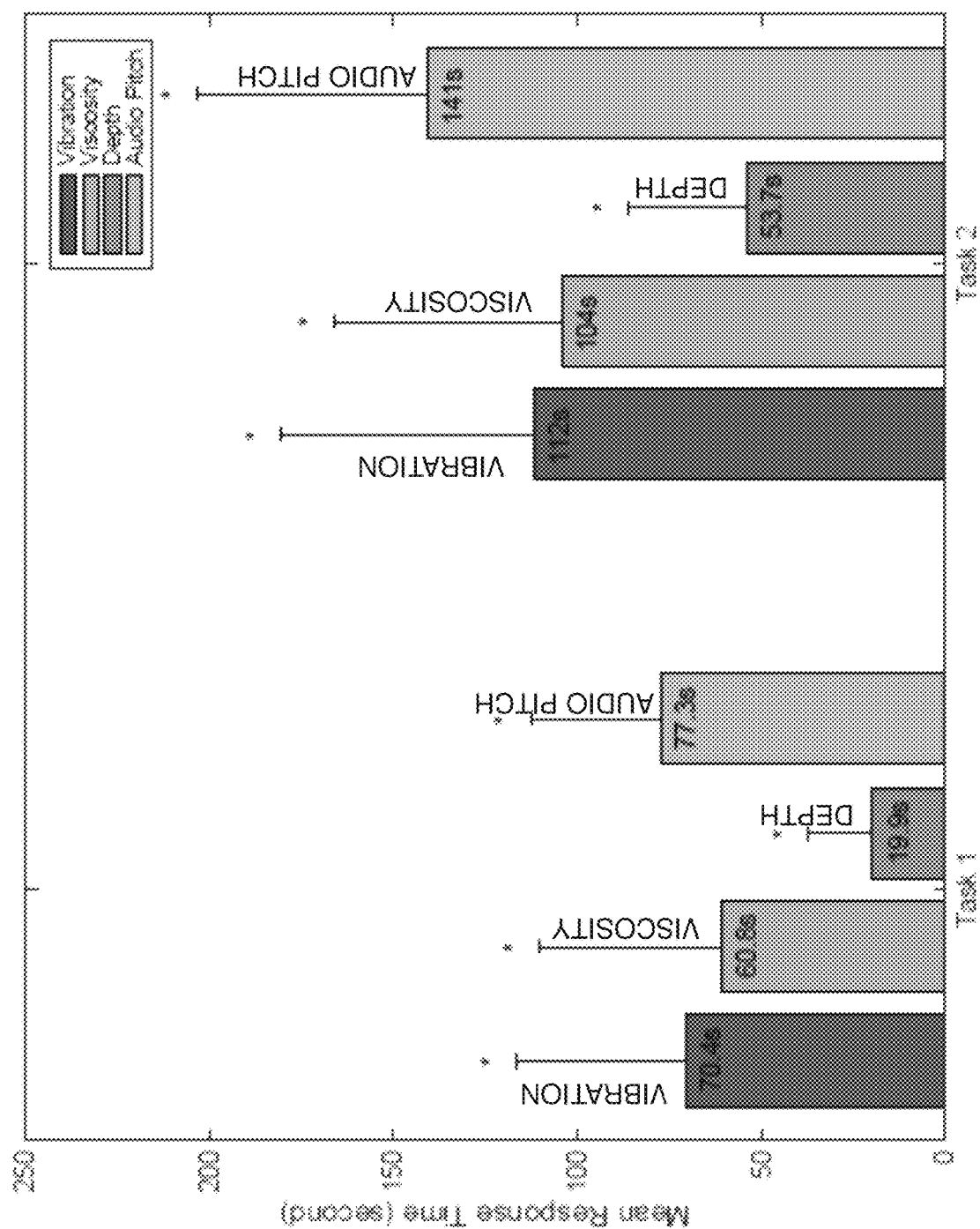
FIG. 9A depicts response time for feature shape for one example using the system of FIG. 1.
Figure 9B:
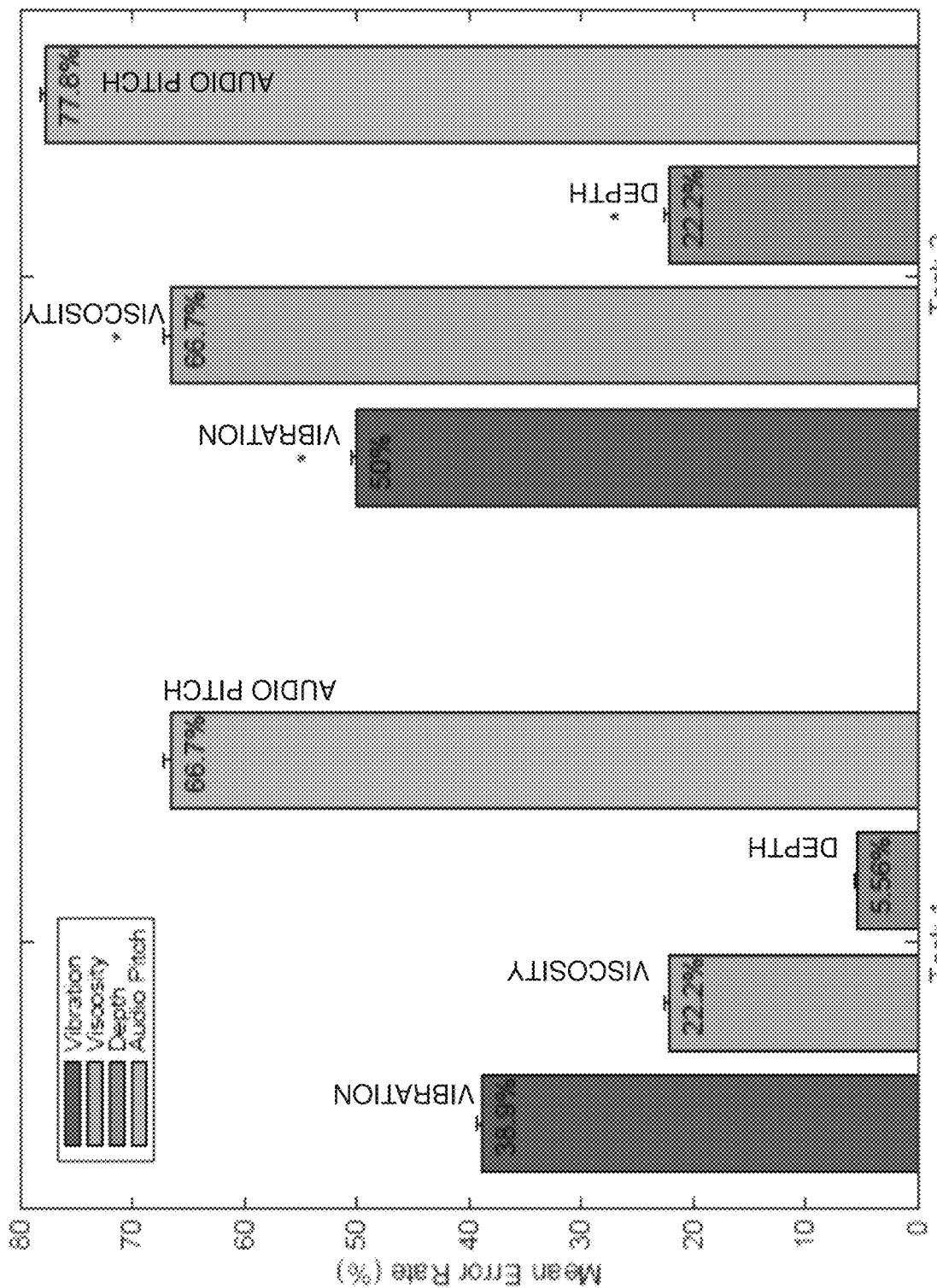
FIG. 9B depicts error rate for feature shape for one example using the system of FIG. 1.

From the leftmost image of FIG. 9, it can be observed that in both tasks, depth showed shortest response time, followed by viscosity, vibration and audio pitch. From task 2 error rate (FIG. 9B), depth showed lowest error rate, followed by vibration, viscosity, and audio pitch. The calculated cost matrix for feature shape is represented as:

$$C(3, j) = [0.265\ 0.269\ 0.143\ 0.323\ \infty]$$

Color.

Figure 10A:
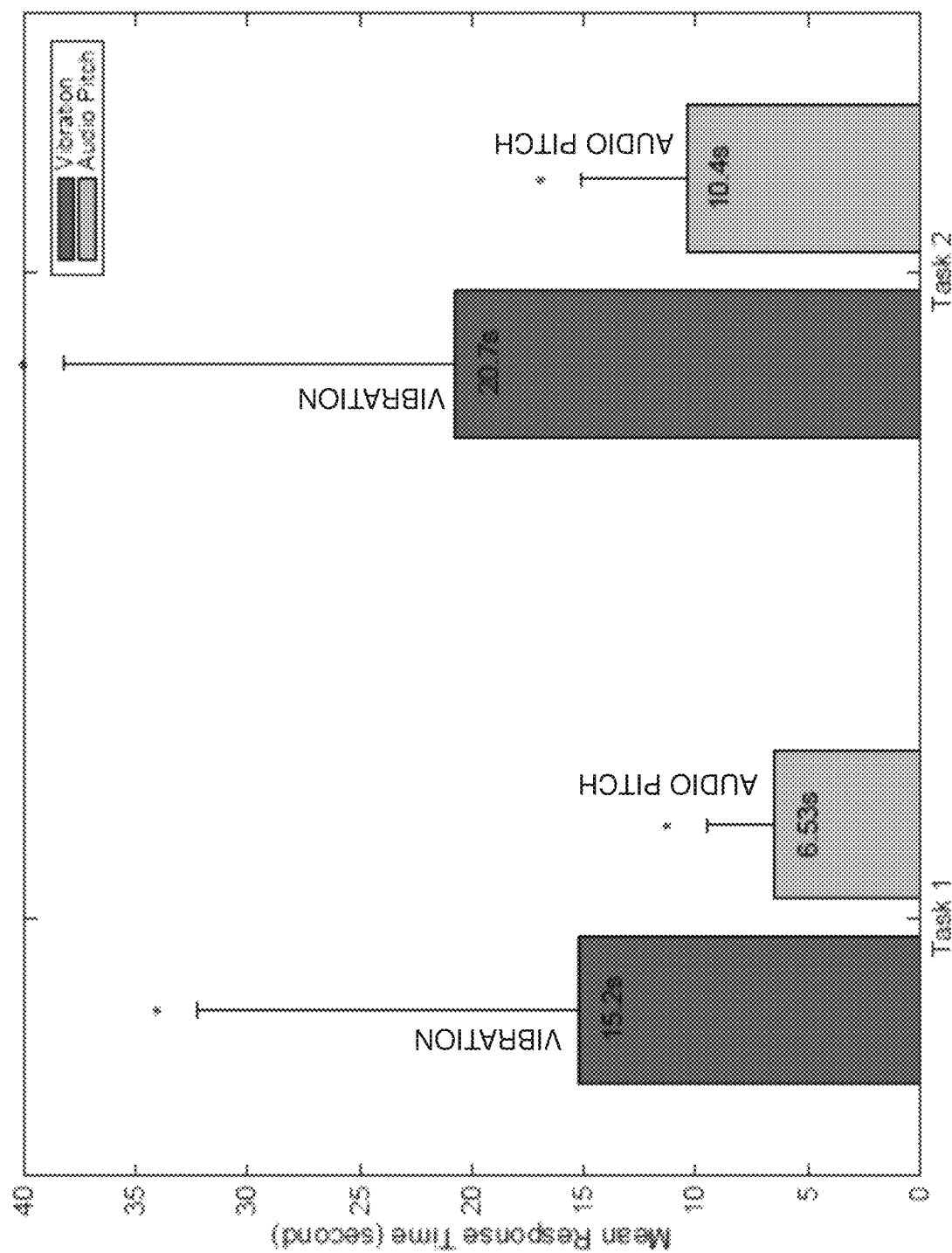
FIG. 10A depicts response time for feature color for one example using the system of FIG. 1.
Figure 10B:
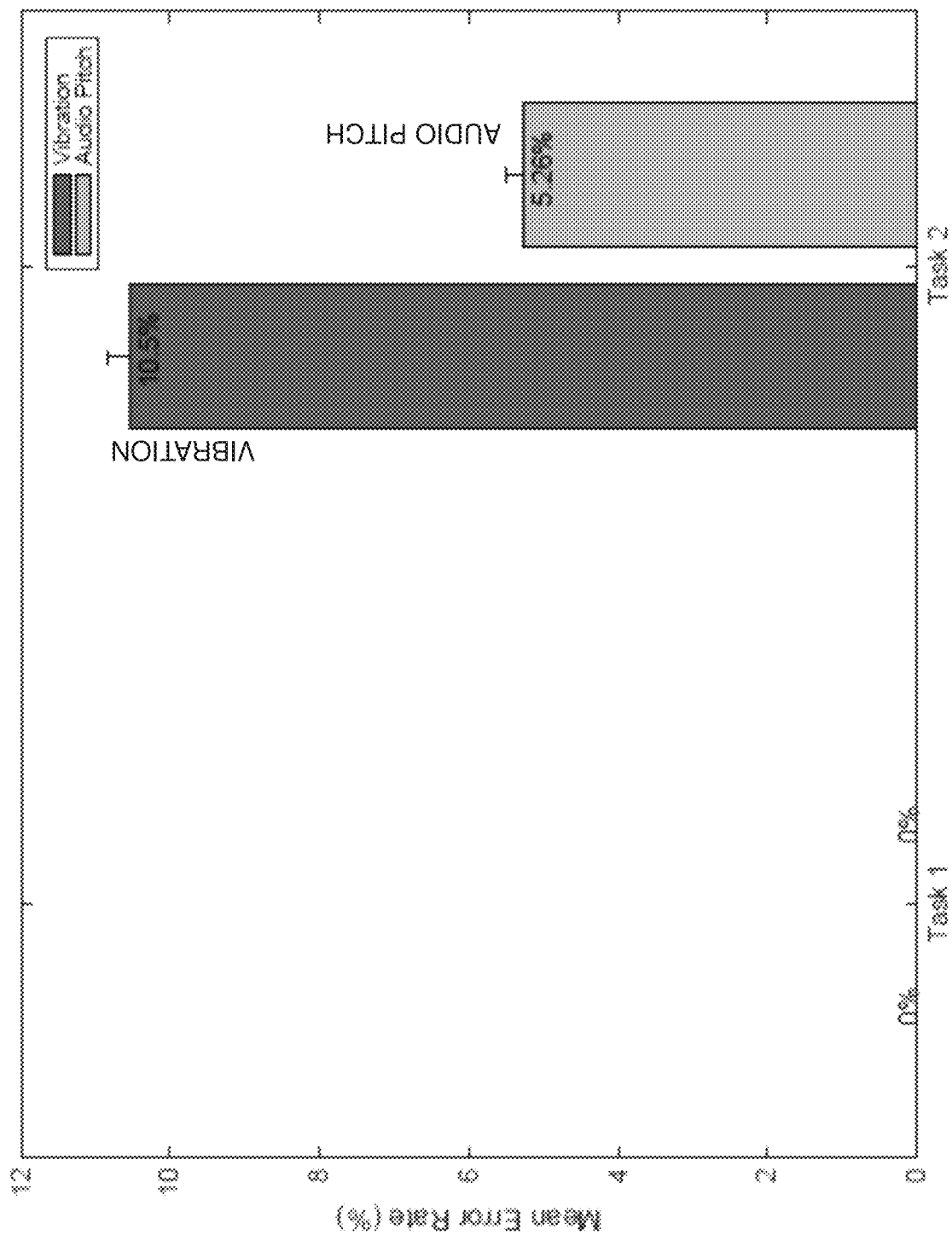
FIG. 10B depicts error rate for feature color for one example using the system of FIG. 1.

There was no difference between the two candidates on error rate (see FIG. 10A). However, there was a significant difference between the two modalities in terms of response time for both task 1 (p=0.0154) and task 2 (p=0.0012). FIG. 10A shows that unique audio cues were associated to higher performance than vibration when representing feature color, since it had less response time for both tasks. It also can be observed from FIG. 10B that unique audio cues indicated higher accuracy for task 2. The cost matrix for feature color is shown as:

$$C(4, j) = [0.591\ \infty\ \infty\ \infty\ 0.409].$$

Cost Matrix.

The costs of modalities for each feature are summarized below in Table VIII. Smaller numbers indicate better performance (lower costs).

TABLE VIII

Summary of costs for each assignment from image features to sensory modalities.

| | Vibration | Viscosity | Depth | Audio Pitch | Unique Audio Cues |
|---|---|---|---|---|---|
| Intensity | 0.197 | 0.280 | 0.294 | 0.229 | ∞ |
| Texture | 0.198 | 0.274 | 0.308 | 0.220 | ∞ |
| Shape | 0.265 | 0.269 | 0.143 | 0.323 | ∞ |
| Color | 0.591 | ∞ | ∞ | 0.409 | ∞ |

Assignment Results.

Figure 11:
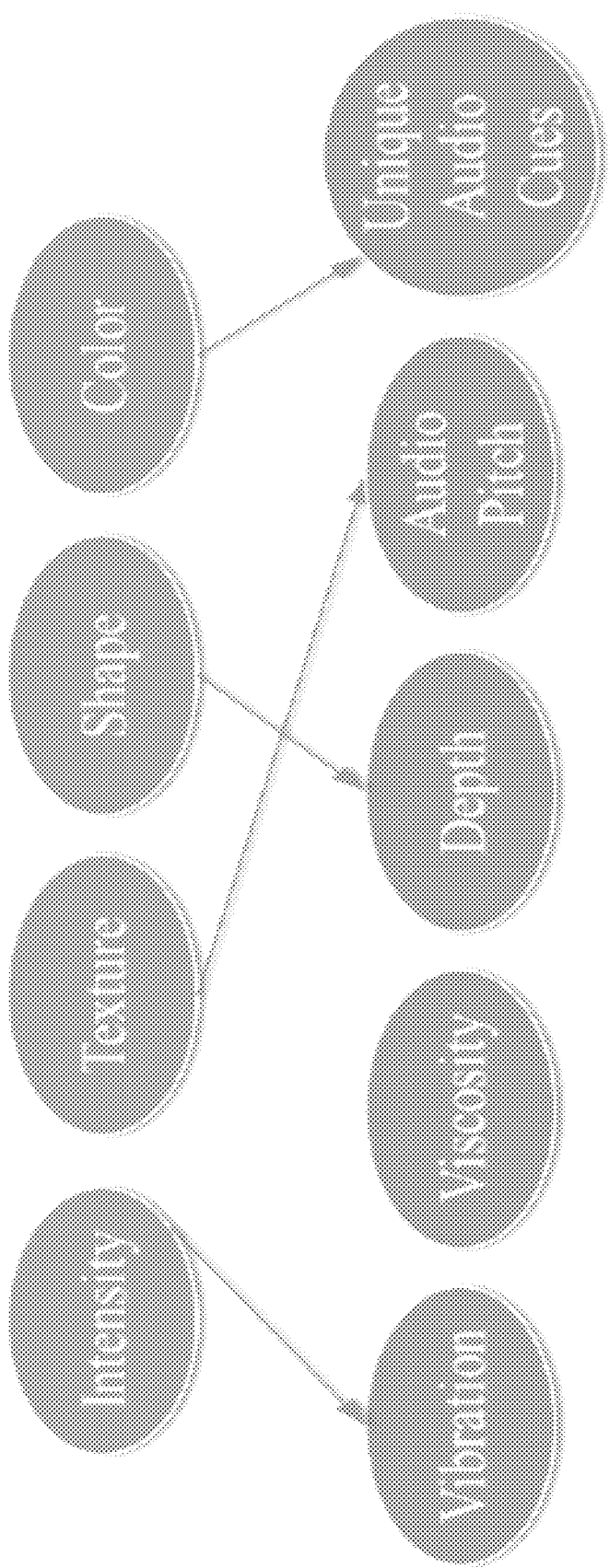
FIG. 11 depicts assignment results for one example using the system of FIG. 1.

The optimized matching between modality and feature computed by both LAP and QAP are the same, as shown in FIG. 11. Intensity was assigned to vibration with texture assigned to audio pitch, shape mapped to depth and color mapped to unique audio cues. LAP and QAP may have produced the same solution due to the inner relations among image features and sensory modalities were already embedded in the linear cost since the linear cost was computed based on human performance. There are also studies shown similar results when comparing the LAP and QAP.

Another finding from the assignment results is that the mappings that were found when considering the whole group of modalities and image features were different from the solution found when they were studied in isolation. For example, independently, texture showed best performance with modality vibration. However, it was mapped to audio pitch in the final assignment, which was the second best option. This is because integrating all the mapping together provided better performance when vibration was used for intensity.

B. Experiment 2: Comparing with Print-Out Tactile Paper:

a A t-test was performed to validate the difference between the response time and error rates of the two methods.

Figure 12A:
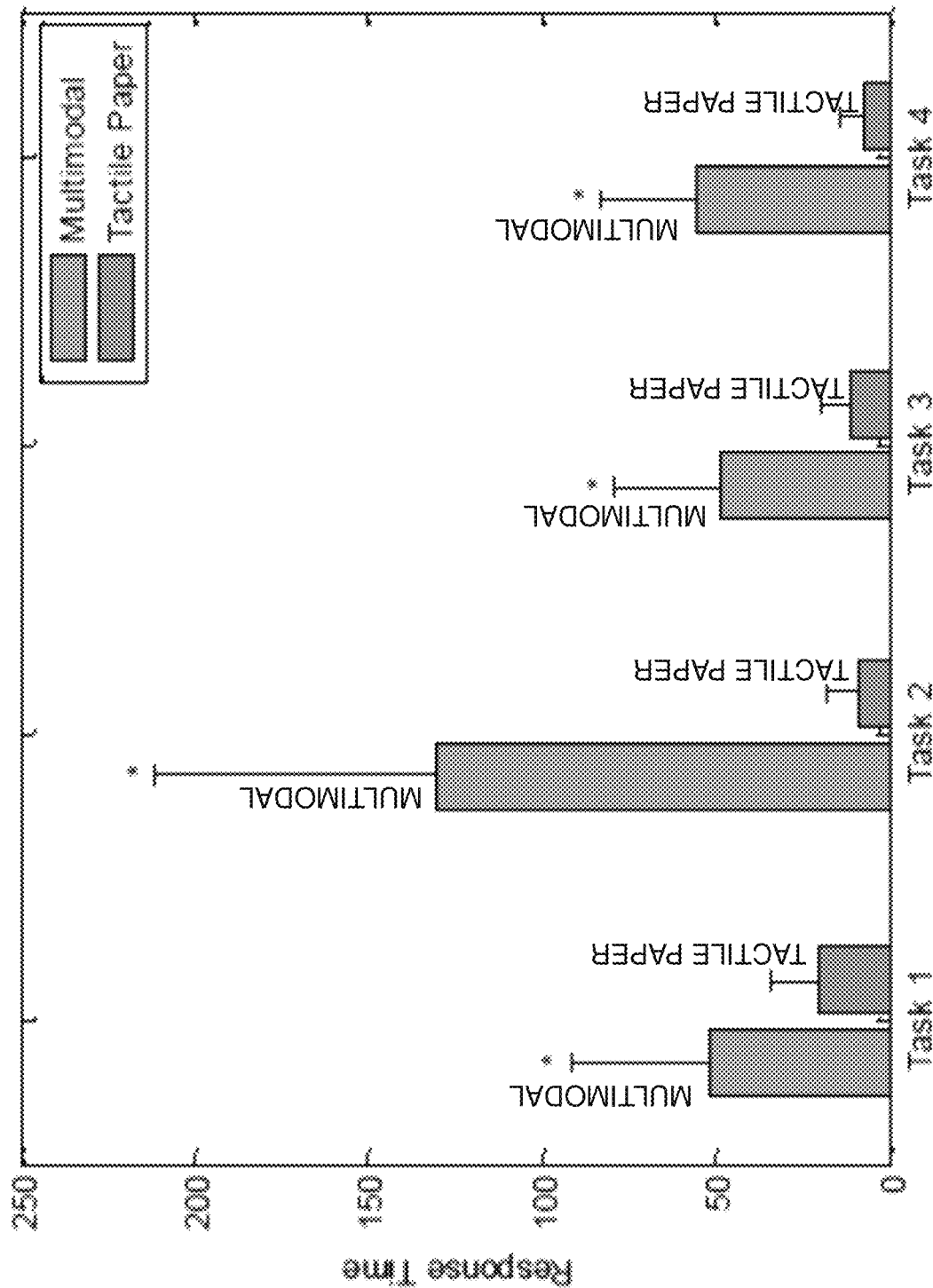
FIG. 12A depicts response time using the system of FIG. 1 compared to a tactile paper for a group of blindfolded subjects.
Figure 12B:
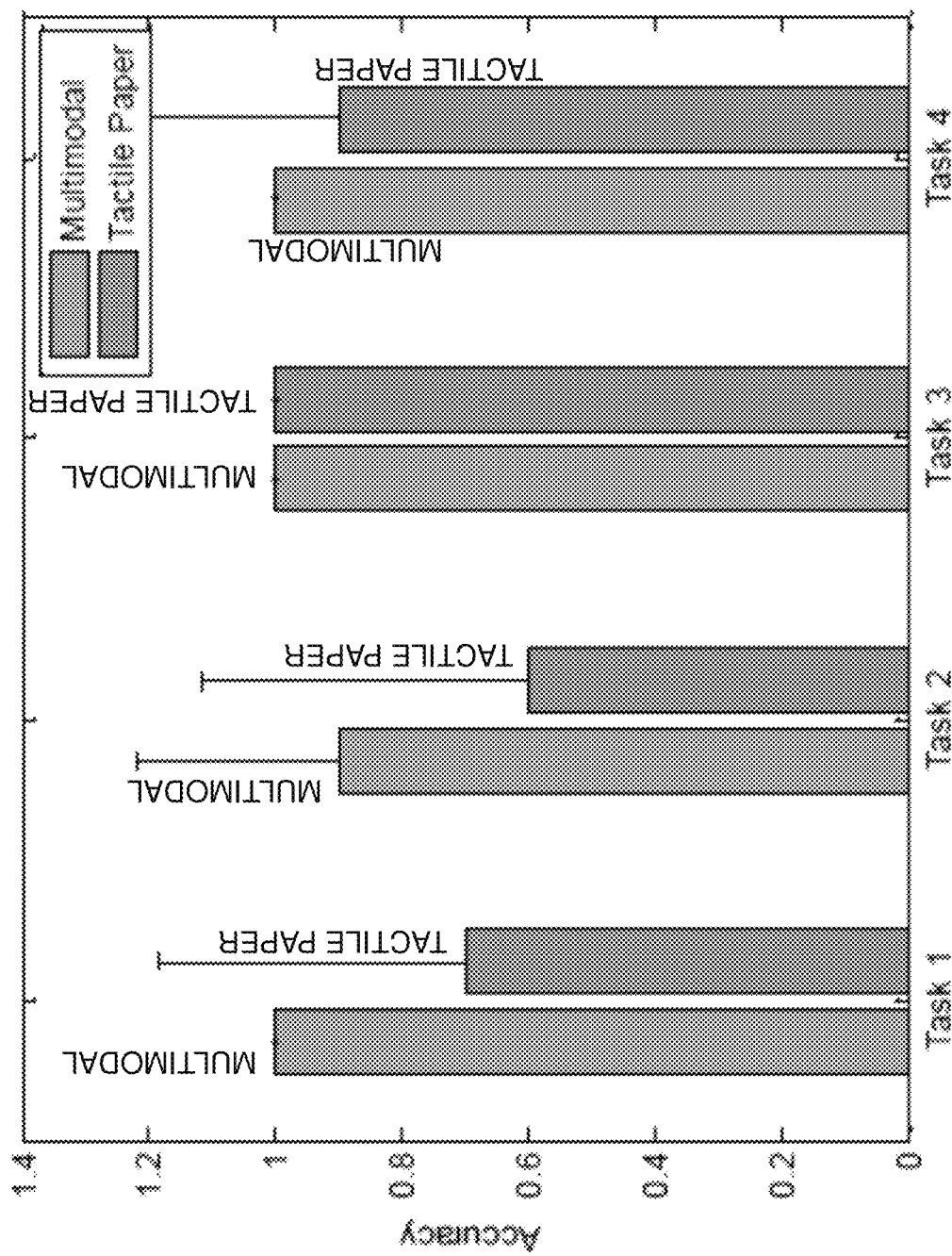
FIG. 12B depicts error rate using the system of FIG. 1 compared to a tactile paper for a group of blindfolded subjects.

Blind-Folded Subjects:

For the group of blindfolded subjects, the p-values of response time for the four tasks are: p1=0.086, p2=0.007, p3=0.023 and p4=0.001. The p-values indicated a significant difference between the multimodal method and the tactile paper, except for the first task, where no significance was found. However, the p-values of error rates for the four tasks indicated no significant difference between the multimodal approach and the tactile paper. FIG. 12 shows the mean response time and error rates for all the tasks in experiment 2 for the group of blindfolded subjects.

Figure 13A:
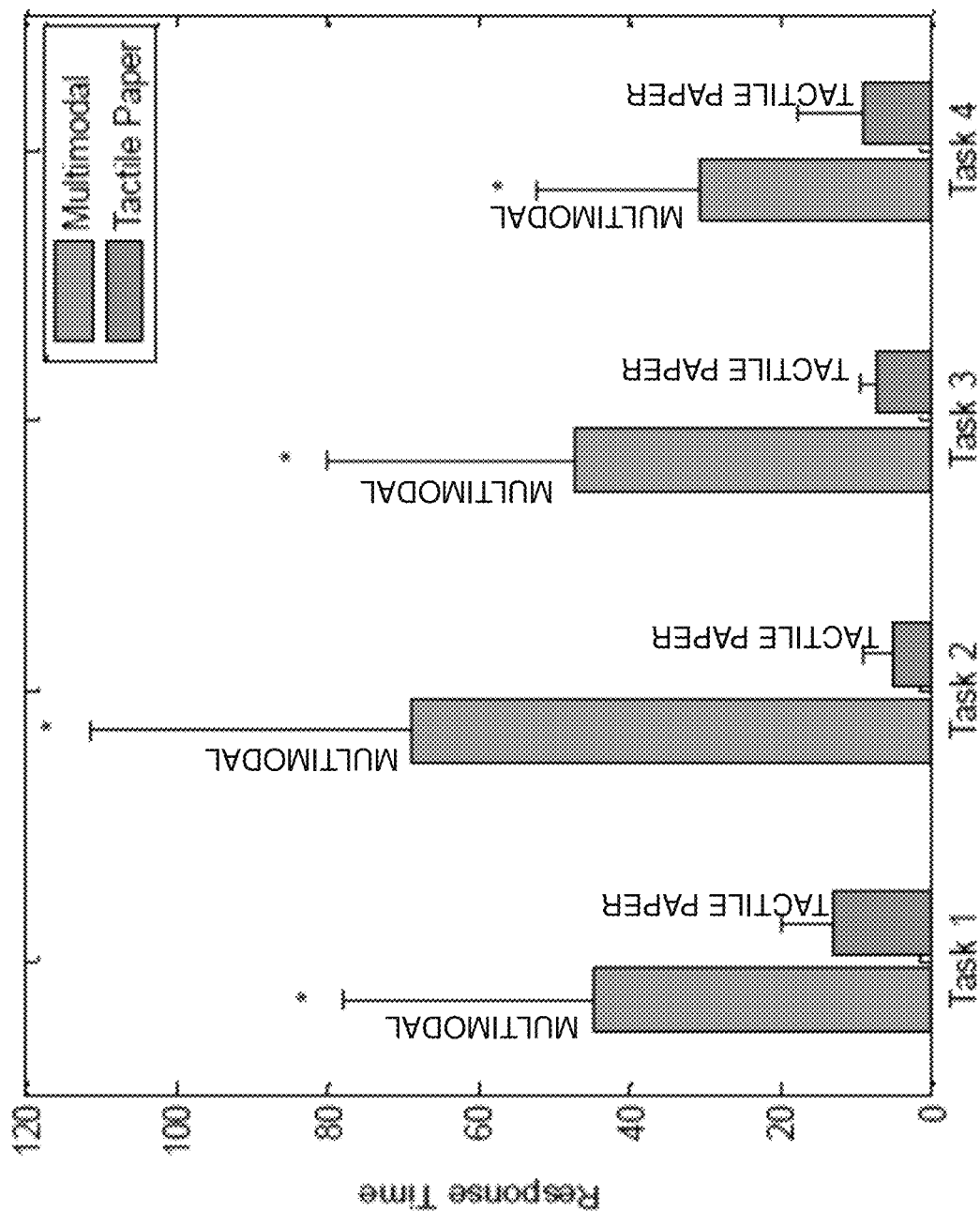
FIG. 13A depicts response time using the system of FIG. 1 as compared to a tactile paper for a group of blind subjects.
Figure 13B:
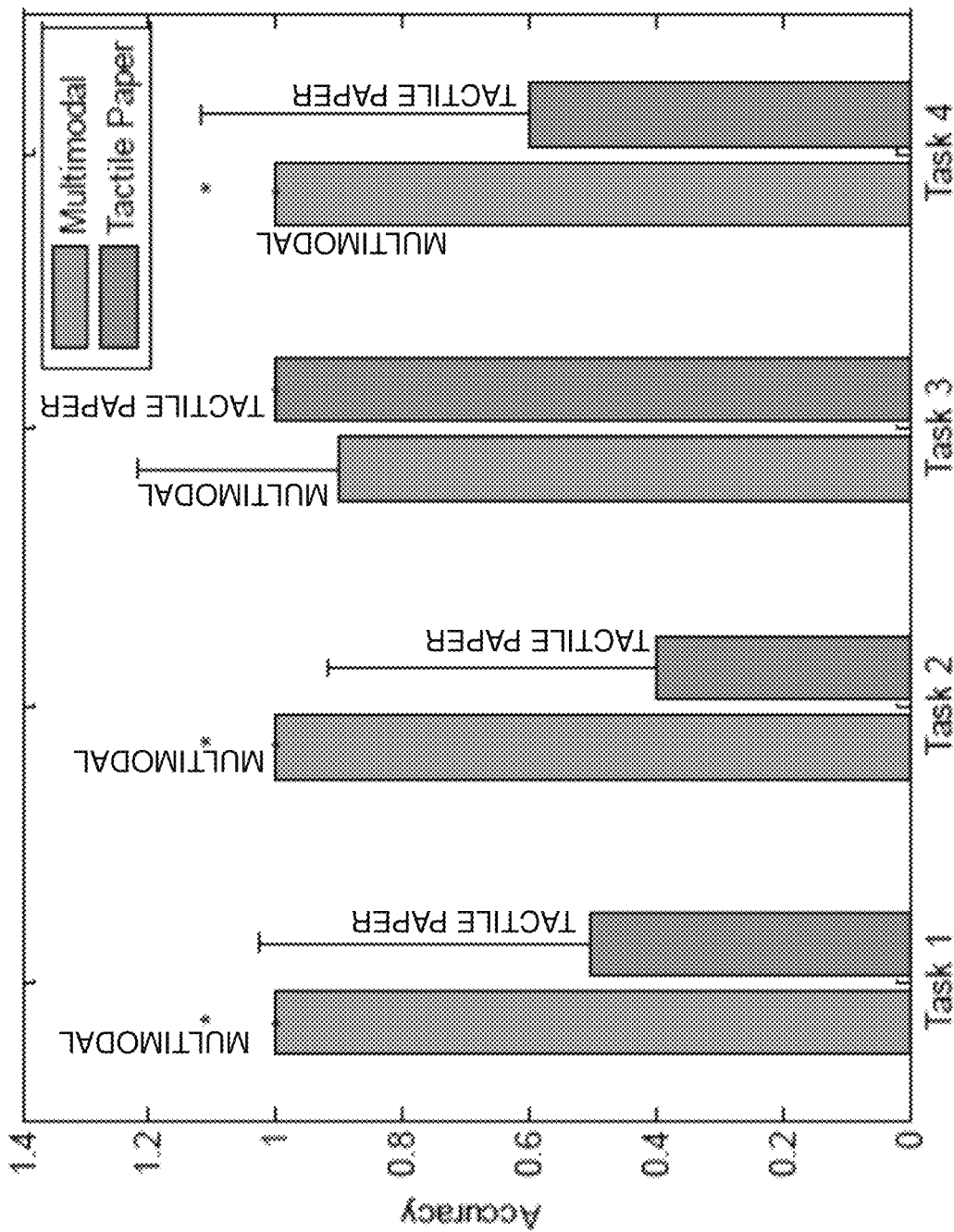
FIG. 13B depicts error rate using the system of FIG. 1 as compared to a tactile paper for a group of blind subjects.

Blind Subjects:

For the group of blind subjects, the p-values of response time for the four tasks were: p1=0.014, p2=0.001, p3=0.004 and p4=0.011. All these p-values indicated significant difference between multimodal method and tactile paper. The p-values of error rates for the four tasks were: p1=0.015, p2=0.005, p3=0.34 and p4=0.037. Since the error rate for the third task was not significant different, it was not considered. FIG. 13 shows the mean response time and error rates for all the tasks in experiment 2 for the group of blind subjects.

Although the multimodal method required more time to complete the tasks, it showed higher accuracy in all tasks. The error rates for the first, second and fourth tasks indicated the subjects had significantly better performance while using the multimodal method. The accuracy in differentiating white blood cells and red blood cells was 50% higher in task 1 and 60% higher in task 2, for the multimodal method. For the second task in differentiating normal red blood cells and sickle cells, multimodal method indicated a higher accuracy of 40%.

To determine if the higher accuracy was a result of a longer response time, the correlation coefficient was calculated. Since the correlation value between time/error was positive (0.0901), it can be concluded that lower error rate was not a consequence of longer response time. It may be concluded that the multimodal method had higher accuracy because it provided a perceptually rich way to interpret images compared to using tactile paper. It was also observed during the experiments, that when using the multimodal method, most of the response time was taken to explore the image. Once a cell was located, it required little effort for the participants to recognize the type of cell. Briefly, a key factor that makes navigation of an image effortful, is the singlehand operation and loss of point of reference. In the traditional tactile paper method, both hands were utilized to locate an object and interpret its features. Also, the point of reference can be easily retrieved by the relative position of both hands.

In the second experiment, error rate was considered as a more important factor than response time, because the intent of our system is to be used as an educational tool to help BVI students and scientists learn and recognize the features of different histological images. Therefore, we believe it is more important for users to correctly identify intracellular structures, the shape of various types of cells, and make comparisons between cell types rather than improving the speed of which BVI students or scientists can recognize cell features.

Comparison of Blind and Blind-Folded Subjects:

Although blind subjects had more experience perceiving tactile images printed on paper, there was no significant difference in terms of response time and error rate between blind and blindfolded subjects exploring computer images. However, there was a significant difference in response time when performing task 2. Blind participants performed twice as fast than the blind-folded population in this task.

As observed in the test data, the disclosed system 100 not only decreases the time and work force required to create traditional tactile print-outs, but allows computer-based image data to be interpretable by blind individuals in real-time. This HCI system can be connected to a light microscope or other scientific instruments that employ a computer monitor output in order to represent digitized image information to BVI users in real-time. This substitution of visual scientific data with other sensory outputs allows students and scientists who are BVI to participate in many kinds of scientific investigation and experimentation that are currently unavailable to them. This ability allows them to understand visual scientific data that they have generated by themselves, which is critical when conducting independent research. In addition, alternative sensorial perception of data that is typically rendered visually may provide unique or more in depth understanding of the results from the scientific instrument.

The Bayesian network constructed to infer peripheral image features from primary image features was based on a selection of candidate structures generated by human experts. An expert who is blind, generated three candidate structures based on his experience and current literature. However, it is important to question whether instead of obtaining multiple responses from one expert, the approach should be getting one response from multiple experts who are BVI. Therefore, more experts can be recruited in the future to generate candidate structures between peripheral and primary image features. Besides expert-based modeling, Genetic Algorithm (GA) can also be utilized to generate candidate structures where the dependencies between nodes are generated following genetic operators. The process generating Bayesian networks using GA is called evolution-based modeling. The initial population of candidate structures is generated randomly. Genetic operators, such as crossover and mutation, are then used to generate new generations of candidate structures based on a selected portion of last generation. To select a portion of candidate structures from previous generation, the score function discussed herein is used. The structures that show higher score than their antecedents are selected. The number of iterations is set according to empirical study requirements.

Steps of various methods described herein can be performed in any order except when otherwise specified, or when data from an earlier step is used in a later step. Exemplary method(s) described herein are not limited to being carried out by components particularly identified in discussions of those methods.

Various aspects described herein can be embodied as systems or methods. Accordingly, various aspects herein can take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein can be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media can embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 106 (and possibly also other processors), and that, when loaded into processor 106, cause functions, acts, or operational steps of various aspects herein to be performed by processor 106 (or other processor). Computer program code for carrying out operations for various aspects described herein can be written in any combination of one or more programming language(s), and can be loaded from disk 122 into code memory 120 for execution. The program code can execute, e.g., entirely on processor 106, partly on processor 106 and partly on a remote computer connected to network 150, or entirely on the remote computer Those skilled in the art will recognize that numerous modifications can be made to the specific implementations described above. The implementations should not be limited to the particular limitations described. Other implementations may be possible.

The invention claimed is:

1. A method for enabling visually impaired users to interpret data, comprising:
   receiving an input image using a computer processor, the image representing a biological sample;
   receiving a navigation command from a visually impaired user, the navigation command comprising instructions to direct the processor to evaluate an area within the image;
   automatically extracting a plurality of features from the input image to acquire at least one extracted image feature based on the navigation command using the processor;

developing a Bayesian network using the processor, the Bayesian network is configured to characterize the input image through the two groups of features of interest, the features comprising primary features and peripheral features; and outputting an expression of the plurality of features through at least one sensory modality operatively connected to the computer processor to allow a visually-impaired user to interpret the image features via the at least one sensory modality, wherein the at least one modality comprises at least one of auditory, haptic, and vibrotactile.

2. The method of claim 1, wherein the plurality of features comprises image location, intensity, texture, shape color, size, and opacity.

3. The method of claim 1, wherein a linear assignment problem is utilized to assign the image features to the plurality of sensory modalities.

4. The method of claim 1, wherein a quadtratic assignment problem is utilized to assign the image features to the plurality of sensory modalities.

5. The method of claim 1, wherein the plurality of output devices comprise at least two hand devices to allow the user to use both hands to interface with the system.

6. The method of claim 1, wherein the navigation command is received from a stylus or a gripper operatively connected to the computer processor.

7. The method of claim 1, wherein a haptic device is used by a first hand of the user to navigate the image.

8. The method of claim 7, wherein a second hand of the user is used to interact with the vibrotactile device to perceive the image features.

9. A system for enabling visually impaired users to interpret data, comprising:

an image input device for receiving an image, the image representing a magnified biological sample;

a user input device which is configured to allow the user to navigate within the image;

a plurality of output devices configured to output a plurality of sensory modalities to a visually impaired user; and a computer processing unit operatively connected to the plurality of output devices, the computer processing unit configured to:

receive an input image;

receive a navigation command from a visually impaired user, the navigation command comprising instructions to direct the processor to evaluate an area within the image;

extract a plurality of features from the input image to acquire at least one extracted image feature based on the navigation command;

develop a Bayesian network, the Bayesian network is configured to characterize the input image through the two groups of features of interest, the features comprising primary features and peripheral features; and output an expression of the plurality of features through at least one sensory modality to allow a visually-impaired user to interpret the image features via the at least one sensory modality, wherein the at least one modality comprises at least one of auditory, haptic, and vibrotactile.

10. The system of claim 9, wherein the plurality of features comprises image location, intensity, texture, shape color, size, and opacity.

11. The system of claim 9, wherein a linear assignment problem is utilized to assign the image features to the plurality of sensory modalities.

12. The system of claim 9, wherein a quadtratic assignment problem is utilized to assign the image features to the plurality of sensory modalities.

13. The system of claim 9, wherein the plurality of output devices comprise at least two hand devices to allow the user to use both hands to interface with the system.

14. The system of claim 9, wherein the navigation command is received from a stylus or a gripper operatively connected to the computer processor.

15. The system of claim 9, wherein a haptic device is used by a first hand of the user to navigate the image.

16. The system of claim 15, wherein a second hand of the user is used to interact with the vibrotactile device to perceive the image features.

* * * * *